United States Patent [19]

Umeda et al.

[11] Patent Number: 5,396,314
[45] Date of Patent: Mar. 7, 1995

[54] IMAGE FORMING APPARATUS HAVING FUNCTIONAL REDUNDANCY SYSTEM

[75] Inventors: Yasushi Umeda, Chofu; Tetsuo Tomiyama, Chiba; Hiroyuki Yoshikawa, Tokyo; Yuichi Koike, Tokorozawa; Yoshiki Shimomura, Yawata; Kazuto Hori, Sakai; Sadao Tanigawa, Ikoma, all of Japan

[73] Assignee: Mita Industrial Co., Ltd., Osaka, Japan

[21] Appl. No.: 989,512

[22] Filed: Dec. 11, 1992

[30] Foreign Application Priority Data

Dec. 19, 1991 [JP] Japan .................................. 3-336725

[51] Int. Cl.⁶ .................... G03G 15/02; G03G 15/04; G03G 21/00
[52] U.S. Cl. .................................. 355/207; 355/208; 355/219; 371/16.4
[58] Field of Search ............... 355/205, 206, 207, 208, 355/219, 221; 371/16.4

[56] References Cited

U.S. PATENT DOCUMENTS

| | | | |
|---|---|---|---|
| 3,764,207 | 10/1973 | Obuchi | 355/219 |
| 4,996,562 | 2/1991 | Mizude | 355/205 |
| 5,012,279 | 4/1991 | Nakajima et al. | 355/205 |
| 5,021,832 | 6/1991 | Fukushima | 355/219 X |
| 5,127,012 | 6/1992 | Hiliger | 355/205 X |
| 5,164,779 | 11/1992 | Araya et al. | 355/219 |
| 5,200,779 | 4/1993 | Nawata | 355/206 |
| 5,239,547 | 8/1993 | Tomiyama et al. | 355/207 X |

Primary Examiner—Fred L. Braun
Attorney, Agent, or Firm—Beveridge, DeGrandi, Weilacher & Young

[57] ABSTRACT

An image forming apparatus has a functional redundancy system by which an inherent function normally performed by a certain portion is performed as a potential function by another portion, when such certain portion no longer can be perform its inherent function. In a first operative sequence, portions in the image forming apparatus perform their respective inherent functions. However, where a function of a certain portion in the apparatus is lost, for example, where a fault occurs and a particular element has failed, operation of other portions in the apparatus are controlled according to a second sequence. In the second sequence, the inherent function of the portion which has failed is replaced by the potential function of another portion in the apparatus.

48 Claims, 33 Drawing Sheets

PARAMETER X  0 LOW 20 NORMAL 23 HIGH

PARAMETER Vs  LOW 750 NORMAL 760 HIGH

PARAMETER Os  LOW 8 NORMAL 15 HIGH

PARAMETER Vn  LOW 600 NORMAL 800 HIGH

OBJECTIVE MODEL OF CHARGING FUNCTIONAL PORTION

FIG. 24

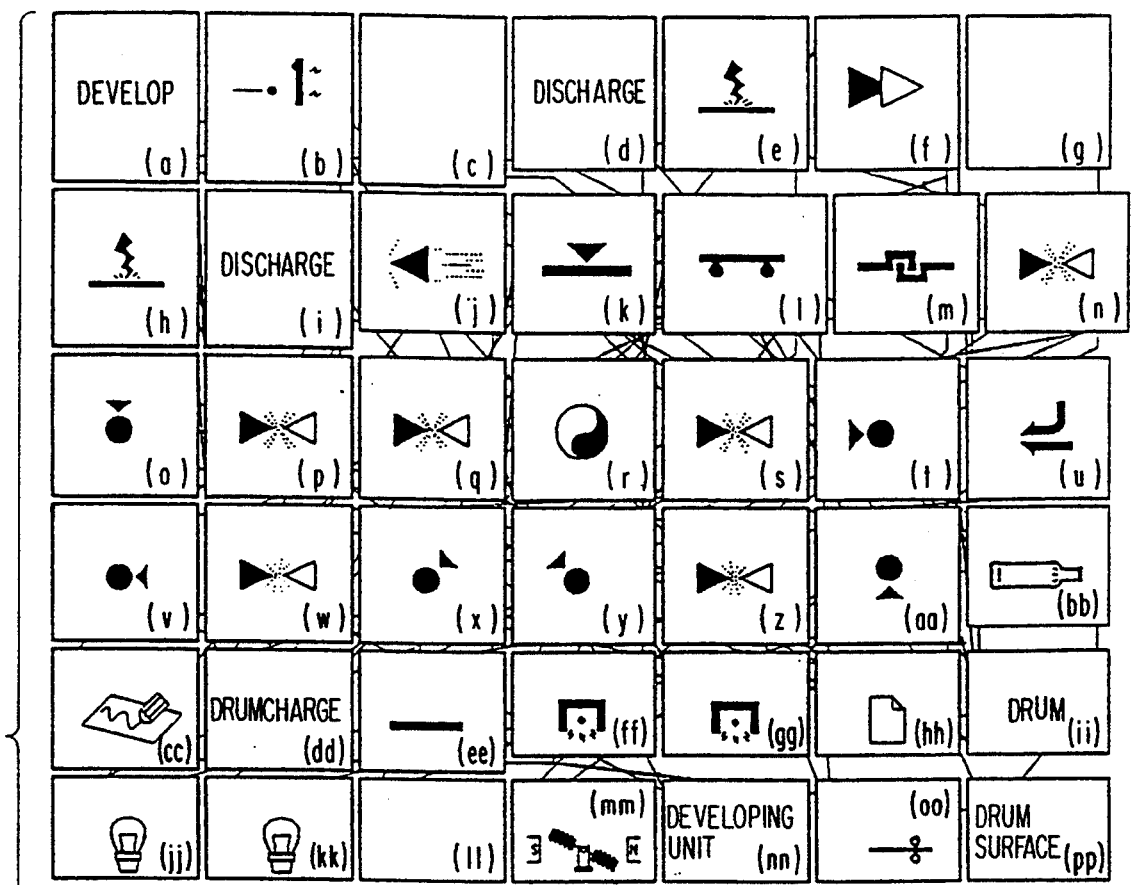

(a) DEVELOP
(b) TRANSFER
(c) CLEANING
(d) DISCHARGE
(e) MAINCHARGE
(f) TRANSMISSION
(g) EXPOSE
(h) MAINCHARGE
(i) DISCHARGE
(j) DRIVE
(k) SURFACE
(l) PAPERROLLERCONTACT
(m) CONNECT
(n) FACINGCONTACT4
(o) ENVIRON0
(p) FACINGCONTACT0
(q) FACINGCONTACT6
(r) PAPERROLLERDRIVE
(s) FACINGCONTACT2
(t) ENVIRON4
(u) TRANSPOSITION
(v) ENVIRON2
(w) FACINGCONTACT3
(x) ENVIRON1
(y) ENVIRON5
(z) FACINGCONTACT1
(aa) ENVIRON3
(bb) DRUMTONER
(cc) PAPERIMAGE
(dd) DRUMCHARGE
(ee) PAPERMOVEMENT
(ff) TRANSCHARGER
(gg) MAINCHARGER
(hh) PAPER
(ii) DRUM
(jj) HALOGENLAMP
(kk) DISCHARGELAMP
(ll) CLEANINGBLADE
(mm) MOTOR
(nn) DEVELOPINGUNIT
(oo) PAPERROLLER
(pp) DRUMSURFACE

FIG. 25

(NORMAL TIME)

| PARAMETER \ TIME | TIME 0 | TIME 1 | TIME 2 | TIME 3 | TIME 4 |
|---|---|---|---|---|---|
| MC MODE |  | ON |  |  |  |
| HI MODE |  |  | ON |  |  |
| Dev MODE |  |  |  | ON |  |
| TC MODE |  |  |  |  | ON |
| DRUM ANGLE |  | A0 | A1 | A2 | A3 |
| CHARGING QUANTITY OF DRUM | NOTHING | NOTHING ↓ FULL | FULL ↓ EXPOSED |  |  |
| DRUM TONER DENSITY | NOTHING |  |  | NOTHING ↓ FULL | FULL |
| PHENOMENON ⇒ | INITIAL | PRINCIPAL CHARGING | EXPOSURE | DEVELOPMENT | TRANSFER |

REQUIRED BEHAVIOR

FIG. 28

(METHOD 3)

| PARAMETER \ TIME | TIME 0 | TIME 1 | | TIME 4 |
|---|---|---|---|---|
| M C MODE (crossed out) | | | FROM PHENOMENON KNOWLEDGE OF DEVELOPMENT | |
| H I MODE | | | | |
| D ev MODE | | | O N | |
| T C MODE | | O N | | O N |
| DRUM ANGLE | | A 3 | A 2 | A 3 |
| CHARGING QUANTITY OF DRUM | NOTHING | NOTHING → FULL | EXPOSED | |
| DRUM TONER DENSITY | NOTHING | | ? → FULL | FULL |
| PHENOMENON ⇒ | INITIAL | PRINCIPAL CHARGING | DEVELOPMENT | TRANSFER |

PHENOMENON KNOWLEDGE
- DEVELOPMENT
    CONDITION
    - D ev MODE = O N
    - DRUM ANGLE = A 2
    - DRUM CHARGE = Exposed
    EFFECT
    - DRUM TONER → FULL

FIG. 29

(TIME OF OCCURRENCE OF FAULT IN MAIN CHARGER)

| PARAMETER \ TIME | TIME 0 | TIME 1 | TIME 2 | TIME 3 | TIME 4 |
|---|---|---|---|---|---|
| ~~MC MODE~~ | | | | | |
| HI MODE | | | ON | | |
| Dev MODE | | | | ON | |
| TC MODE | | ON | | | ON |
| DRUM ANGLE | | A3 | A1 | A2 | A3 |
| CHARGING QUANTITY OF DRUM | NOTHING | NOTHING ↓ FULL | FULL ↓ EXPOSED | | |
| DRUM TONER DENSITY | NOTHING | | | NOTHING ↓ FULL | FULL |
| PHENOMENON ⇒ | INITIAL | PRINCIPAL CHARGING | EXPOSURE | DEVELOPMENT | TRANSFER |

REQUIRED BEHAVIOR

IMAGE FORMING APPARATUS HAVING FUNCTIONAL REDUNDANCY SYSTEM

BACKGROUND OF THE INVENTION

1. Field of the Invention

The present invention relates generally to an image forming apparatus comprising a redundancy system, and more particularly, to an image forming apparatus comprising a functional redundancy system as a redundancy system.

"Functional redundancy" means "using a part which originally exists in an apparatus and making use of the part utilizing a potential function of the part as a substitute for another part".

2. Background of the Invention

At the present time machine civilization advances, failures in an apparatus system exert very great effects on society. Accordingly, various types of maintenance have been performed on the apparatus system.

The following three means have been generally considered for the maintenance on the apparatus system. Specifically:
1. High-reliability design: making such design that no fault occurs in the apparatus system.
2. Preventive maintenance: preventing a fault from occurring in the apparatus system during the use.
3. Corrective maintenance: preventing, even if a fault occurs in the apparatus system, the fault from affecting the whole apparatus system to recover its function in a short period of time.

However, there are limitations of such concepts. First, as for the high-reliability design, there is a physical limitation of increase in quality of parts, and the cost of the apparatus system is liable to suddenly rise. In addition, in considering redundant design for ensuring the reliability, the sudden rise in cost due to the hugeness of the apparatus system cannot be ignored. Furthermore, in considering fault tolerant design or as for the preventive maintenance, the fault must be able to be expected. However, it is difficult to expect the fault as the apparatus system is complicated.

On the other hand, if the effect of the failures in the apparatus system on society is considered, it is actually very dangerous to consider only fail-safe and the corrective maintenance.

Therefore, it is necessary to positively recognize the possibility that a fault occurs and consider measures taken to prevent, even if a fault occurs, the fault from exerting a functional effect.

DESCRIPTION OF THE PRIOR ART

As one of measures taken to prevent, when a fault occurs, the fault from exerting a functional effect, it has been known that a redundancy system is given to an apparatus.

The most common redundancy system is to, prepare excess means having the same function, and this redundancy system is given for the purpose of increasing the reliability of the whole apparatus. The redundancy system is actually realized by arranging a plurality of parts of the same type in parallel, which shall be referred to as "part redundancy". One example of the part redundancy is disclosed in, for example, Japanese Patent Laid-Open Gazette No. 11520/1988. The part redundancy is effective means in which the larger the number of parts arranged in parallel is, the higher the reliability becomes. As a result, the weight and the cost of an apparatus system are increased. In addition, the apparatus system may, in some cases, be inversely complicated, thereby causing the reliability to be decreased.

Japanese Patent Laid-Open Gazette No. 110601/1990 discloses as another redundancy system a control system referred to as "coordination dispersion". A coordination dispersion control system disclosed in this gazette is a system in which when a fault occurs in a certain control device, a subsystem of a plant controlled by the control device is assigned so as to be placed under control of another suitable control device. Specifically, in a case where a system has a plurality of control devices, if a fault occurs in a certain control device, a task related to the control device which fails is assigned to the other control device in accordance with a predetermined sharing rule so that control carried out by the control device which fails is shared with the other control device. This coordination dispersion control system is effective as a redundancy system for a control device in a system comprising a plurality of control devices, but cannot be a redundancy system for apparatus parts controlled by the control device, that is, an apparatus system itself.

As described in the foregoing, the "part redundancy" out of the conventional redundancy systems is a redundancy system for an apparatus system itself (controlled parts). However, the "part redundancy" requires parts to be arranged in parallel so as to realize the redundancy system in addition to parts inherently required, so that it has several disadvantages. For example, the cost is increased, the weight is increased, and the construction becomes complicated. In addition, the "coordination dispersion" is a redundancy system for a control device and cannot be applied to a controlled device.

SUMMARY OF THE INVENTION

The present invention has been made from a point of view which is entirely different from the conventional redundancy system, and provides an image forming apparatus having a redundancy system based on a new concept of a functional redundancy system. That is, the present invention is completed on the basis of a new concept of designing such an apparatus as to make, even if a fault occurs, self-repair of the fault so that its function can be automatically recovered by reconstructing the structure in any method, that is, using functional redundancy.

An object of the present invention is to realize a so-called "softly broken" image forming apparatus by constructing a self-repair type image forming apparatus based on functional redundancy.

Retrieving an alternative function on the basis of an FBS diagram and developing the alternative function retrieved is changing the structure of an apparatus and developing redundancy using a potential function of a part inherently performing another function.

Therefore, in cases, for example, a case where a fault occurs in an apparatus so that the apparatus is not moved and a case where a user desires to stop the movement of the apparatus for any reason, a lost function is recovered by utilizing a part which originally exists in the apparatus and substituting the existing part for a part which fails or a part whose operation is stopped.

When a fault occurs in a certain part or the like in the apparatus or when a particular part or the like is stopped as required, the same function as a function developed by the part which fails or the part which is stopped can be developed using a potential function of the other existing part or the like, and the function performed by the part which fails or the part which is stopped can be recovered, thereby to allow the apparatus to have redundancy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 24 is a diagram showing an example of display representing the dependent relationship among all phenomena which may occur on a view network with respect to an image forming mechanism of a copying machine;

FIG. 25 is a diagram showing a qualitative timing chart at the normal time in an image forming mechanism;

FIG. 28 is a diagram for explaining a method of forming a qualitative sequence at the time of occurrence of a fault;

FIG. 29 is a diagram showing a qualitative timing chart at the time of occurrence of a fault in an image forming mechanism;

DESCRIPTION OF THE PREFERRED EMBODIMENTS

1. Concept of "functional redundancy" and outline of self-repair apparatus using functional redundancy In this term, description is now made of the concept of "functional redundancy" in the present invention as well as an FBS diagram required to represent functional redundancy of an apparatus and utilize the same. In addition, description is made of a design method for giving functional redundancy to an apparatus and the outline of a self-repair apparatus having functional redundancy.

1-1. Definition of "functional redundancy"

"Functional redundancy" means making it possible to make use of a part which originally exists in an apparatus system utilizing a potential function of the part as a substitute for another part.

For example, an automobile with a manual transmission usually runs by engine power. When the engine is not operated, however, the automobile can move by a starting motor. This is an example in which redundancy is given without increasing the number of parts by altering the structure of a driving system to cause the starting motor to develop a potential function "move the body of an automobile" and cause the engine to develop a potential function "transmit a driving force".

Figure 1:
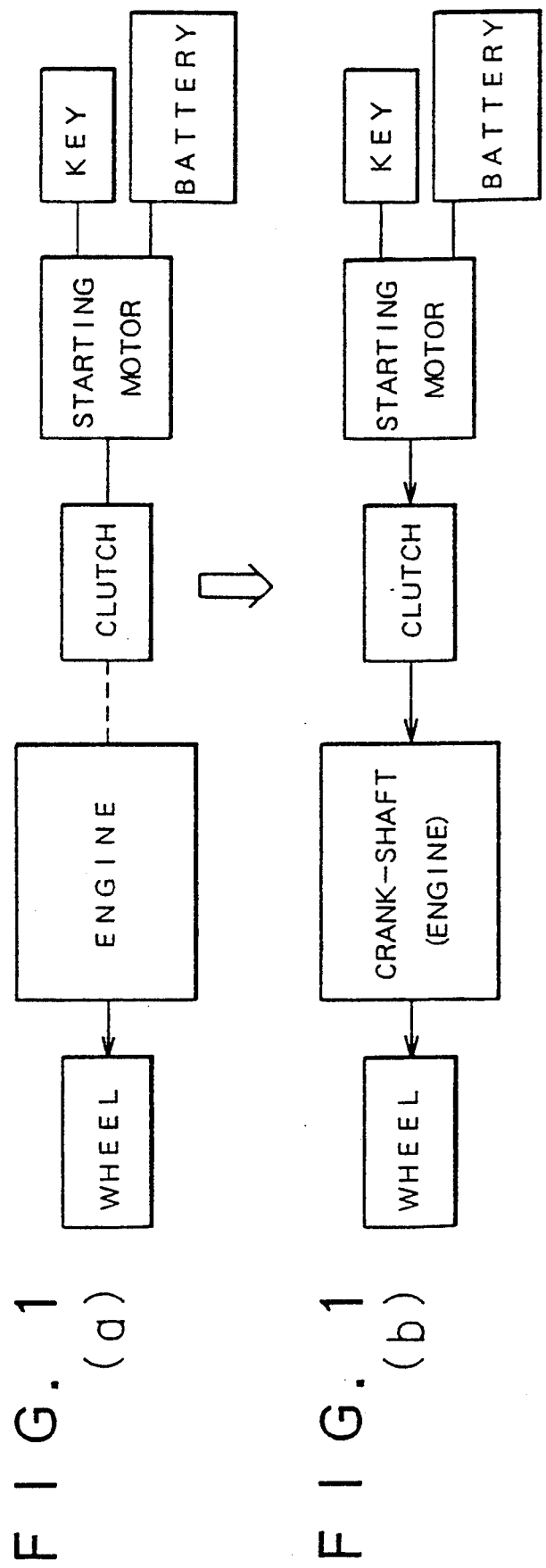
FIGS. 1(a) and 1(b) are illustrations for explaining the definition of "functional redundancy" taking as an example a driving system of an automobile.

Specifically, redundancy is given without increasing the number of parts by changing the construction shown in FIG. 1 (a) to the construction shown in FIG. 1 (b) in which a starting motor is a driving source for "moving the body of an automobile" and a crank-shaft for "transmitting a driving force" is utilized as the engine.

In this specification, thus giving redundancy utilizing a potential function is defined as "functional redundancy".

If the functional redundancy is compared with the conventional part redundancy, they respectively have characteristics and problems, as shown in Table 1.

TABLE 1

| Part Redundancy and Functional Redundancy | |
|---|---|
| Part redundancy | |
| Characteristics | Such "attribute maintenance" that a faulty attribute is replaced with the attribute of a redundant part. |
| | The reliability of a particular area is surely increased. |
| | Design and reliability prediction are easy. |
| Problems | Weight and cost are increased. |
| | It corresponds to only a fault predicted at the time of design. |
| | The reliability may be decreased by an increased complexity in an apparatus. |
| Functional redundancy | |
| Characteristics | Such "functional maintenance" that a lost function is replaced with a part performing another function. |
| | More redundancy can be added by increasing the minimum number of parts required. |
| | It corresponds flexibly to a fault by considering redundancy at a functional level. |
| | It corresponds to various faults including an unexpected fault. |
| | The apparatus does not hard fail. |
| Problems | A design method and a method of reliability prediction are not arranged yet. |
| | Necessity of function judgment and value judgment. |

"Necessity of function judgment and value judgment" listed as a problem of the functional redundancy in Table 1 is as follows: In general, it is not necessarily easy to completely recover a lost function A by a functional redundancy system. However, it is possible to enhance the lost function A to some extent.

For example, in the above described example of the automobile, the automobile only develops a speed of at most 5 km/h when it runs by the starting motor. Accordingly, a function of running at high speed is not performed. In addition, there is a significant restriction on the running time by the starting motor.

In recovering the lost function A, however, judgment whether or not a user can be satisfied with the degree to which the function is developed depending on the functional redundancy system depends on the use conditions and is determined by the value judgment of a human being. In the above described example of the automobile, there is a concept that a user can be satisfied with such function development by considering that the running speed is not so a problem provided that the automobile can run to a gas stand or an auto repair shop. Alternatively, there is also a concept that a user cannot be satisfied with such function development.

The above described value judgment is distinguished from the essence of the present invention, which shall be determined by a dialogue with a user.

The functional redundancy according to the present invention is particularly useful for an apparatus whose operation is controlled by a computer such as a mechatoronics machine. The reason for this is that in an apparatus whose operation is controlled by a computer, the construction of the apparatus can be altered by altering a control pattern on software, thereby to make it sufficiently possible to add a functional redundancy system to the apparatus.

1-2. Object representing method for representing function: FBS diagram

In order to construct an apparatus system having a functional redundancy system incorporated therein, that is, a functional redundancy apparatus system, an apparatus must be represented in the form including functions.

In the present invention, an apparatus is represented by an FBS (Function-Behavior-State) diagram. Specifically, the apparatus is represented by a diagram comprising functions, behaviors and states. The behaviors and the states are represented on the basis of the qualitative process theory by K. D. Forbus. This point will be described in detail later.

The FBS diagram will be first outlined and then, the representation of the functional redundancy apparatus on the FBS diagram will be described.

1-2-1. Definition of FBS diagram

Consideration is given to only the physical world, to define states, behaviors and functions constituting the FBS diagram as follows:

First, states S of a certain apparatus are expressed as the following equation (1) using internal states $S_i$ of the apparatus and external states $S_o$ such as an environment:

$$S = <S_i, S_o> \quad (1)$$

The equation (1) means that a set of states S is described by sets of states $S_i$ and $S_o$.

Furthermore, the internal states $S_i$ are defined as the following equation (2) using a set of substances E representing parts and the like in the apparatus, a set of attributes of substances A representing the size of a gear, a resistance value of a resistor and the like, a set of relationships R representing the connection among parts, the relationship among attributes and the like:

$$S_i = <E, A, R> \quad (2)$$

The external states $S_o$ are described in the same manner as the internal states. In addition, a so-called "structure" of the apparatus is considered as one type of state of the apparatus where the duration is long and is described as a part of the internal states $S_i$. This is for making it possible to flexibly describe the change in the structure itself which may occur due to a fault in the apparatus.

Figure 2:
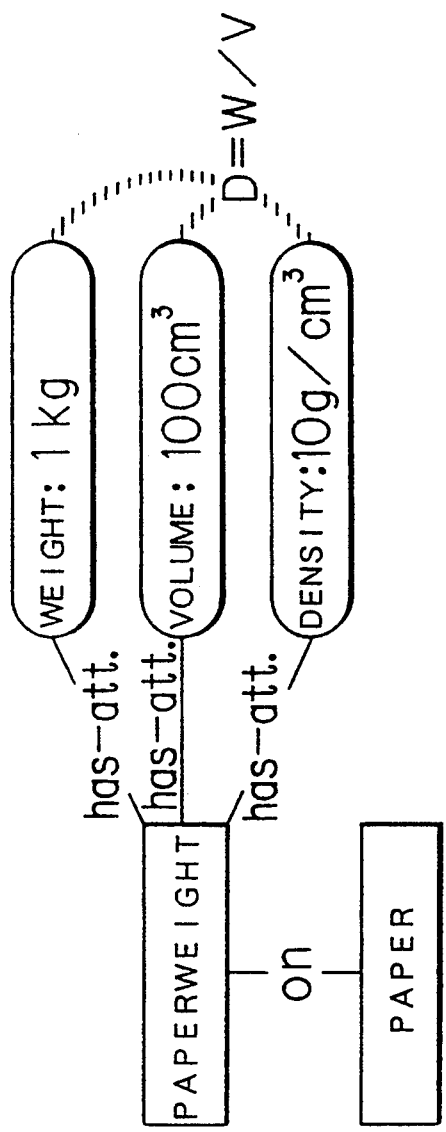
FIG. 2 is a diagram showing, as one example of state description in an FBS diagram, the state description of a paperweight.

One example of state description defined by the equations (1) and (2) is shown in FIG. 2. FIG. 2 shows the state description of a paperweight. In FIG. 2, the paperweight is placed on paper, parameters representing states such as the weight W, the volume V and the density D exist in the paperweight, and there is a relationship $D=W/V$ among the parameters.

Behaviors B are then defined as "change of one or more states (including no change)" using the above described states S. This definition is expressed by the following equations (3), (4) and (5):

$$b = s_1 \rightarrow s_2 \rightarrow \quad (3)$$

$$b \in B \quad (4)$$

$$s_1, s_2, \ldots \in S \quad (5)$$

Specifically, each of behaviors b included in a set of behaviors B is changed in state, for example, $s_1 \rightarrow s_2 \rightarrow \ldots$, and respective states $s_1, s_2, \ldots$ obtained by the change are included in the states S.

It should be noted that it can be considered that the "change of state" is not brought about at random but brought about by a "physical law". A concept that the states S and the behaviors B are thus combined with each other by a physical law is one basic concept of the present invention. Conversely, a knowledge base of a physical law is constructed, thereby to make it possible to manage noncontradiction between the state representation and the behavior representation of an apparatus system by a computer.

On the basis of the foregoing, a function F is then defined as "description of behaviors recognized and abstracted for a certain purpose by a human being". That is, the function is basically described in the form of "make+an object+an objective complement". The definition of this function F is expressed by the following equation (6):

$$\Gamma_{ab}: B \rightarrow F \quad (6)$$

In the equation (6), $\Gamma_{ab}$ indicates the process of recognition and abstraction by a human being, and the behaviors B are converted into the function F through the process.

The relationship between functions and behaviors depends on a human subjective point of view. Another basic concept of the present invention is that many functions can correspond to the same behavior, or vice versa depending on the point of view.

For example, if an electrophotographic copying machine is taken as an example, a plurality of behaviors such as a behavior "light from a neutralization lamp is irradiated on a photosensitive drum so that electrostatic charges are grounded" and a behavior "electrostatic charges on a photosensitive drum are canceled by a discharge phenomenon of a charger" may correspond to a function "remove charges on a photosensitive drum". Such a many-to-many correspondence between functions and behaviors is a basis for making the concept of functional redundancy possible, and an FBS diagram clearly representing the many-to-many correspondence is a prerequisite indispensable to the functional redundancy.

Figure 3:
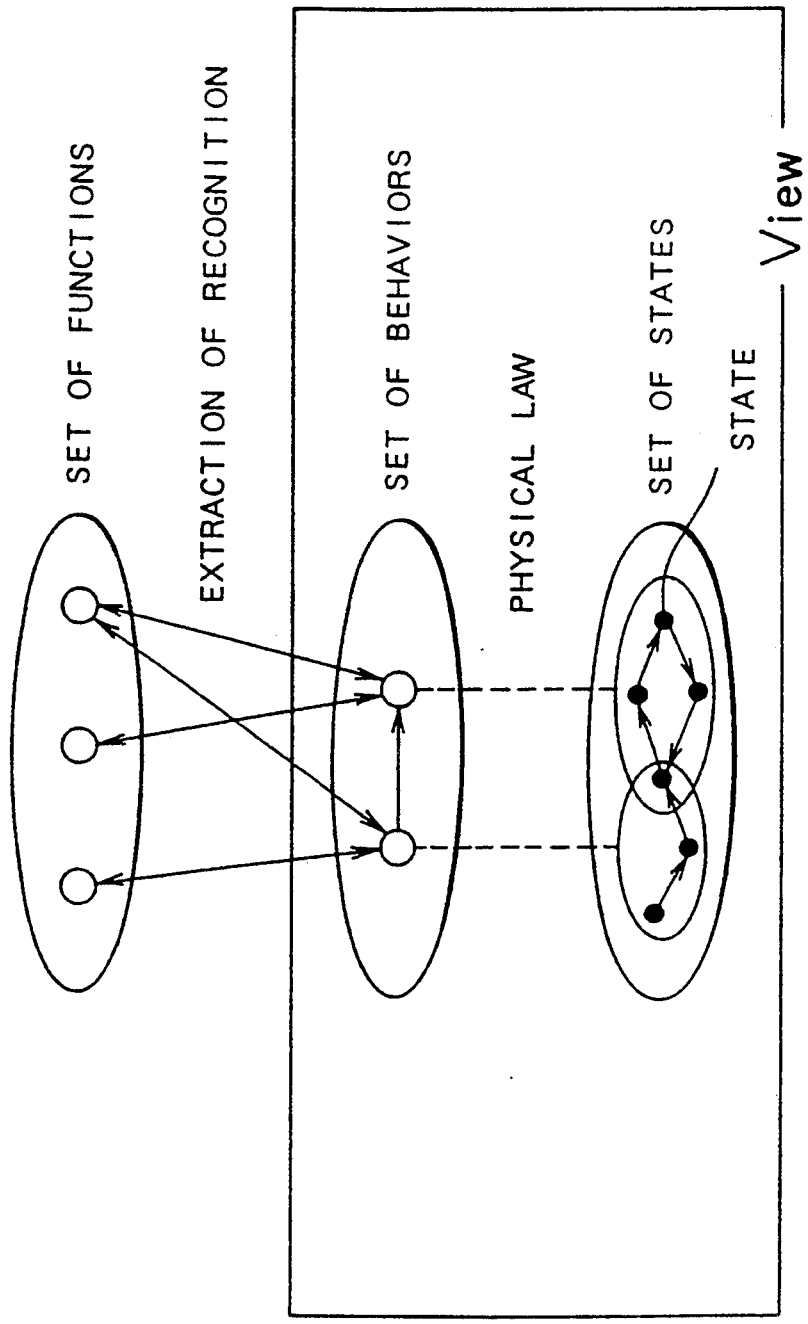
FIG. 3 is a diagram showing the relationship among functions, behaviors and states in an FBS diagram.

The above described relationship among functions, behaviors and states in the FBS diagram is shown in FIG. 3. In FIG. 3, a set of states and a set of behaviors are combined with each other by a physical law, and the set of behaviors and a set of functions correspond to each other by extraction of recognition.

1-2-2. Realization of FBS diagram

Description is now made of a method of realizing the FBS diagram, that is, a method of describing functions, behaviors and states described in the item 1-2-1.

1-2-2-1. Function representation

"Function" defined in the item 1-2-1. is described by a frame "function knowledge" shown in Table 2.

TABLE 2

| Data Structure of Function Knowledge | |
|---|---|
| item | content |
| function name | label representing function |
| realization feature | physical feature realizing the function |
| development knowledge | set of development knowledges |

As shown in Table 2, the "function knowledge" is described by the following items:

"Function name": It is a label representing the function, which is described in the form of "an object (which may be plural)+a verb"

"Realization feature": A physical feature for realizing the function is described in this item. As described later in the item "1-2-2-2. Behavior and State Representation", the physical feature is a knowledge which is a combination of behaviors and states frequently appearing in an apparatus and defines the relationship between "function" and "behavior" previously defined. In general, if a plurality of realization features corresponding to the function described exist, the plurality of features are described. On the other hand, if no realization features exist, no features are described.

"Development knowledge": It is a knowledge representing a developing method for developing the function. In the item of "development knowledge", a set of development knowledges is described. One function knowledge may, in some cases, have several different development knowledges.

A function of an apparatus is generally developed into several partial functions and observed. For example, it is considered that a function of an electrophotographic copying machine "make copies" is realized by combining a function of reading an image, a function of holding the image read, a function of developing the image, a function of transferring the image developed, a function of fixing the image transferred, and the like. In addition, the function of reading an image is constituted by a function of scanning an original, a function serving as a light source, and the like. The partial functions generally constitute a functional hierarchical structure.

In the present invention, therefore, a function knowledge shall have a development knowledge describing a method of developing the function.

Table 3 shows items describing the development knowledge.

TABLE 3

| Development Knowledge | |
|---|---|
| item | content |
| development knowledge name | name |
| partial function | network representing functional hierarchical structure in which |

TABLE 3-continued

| | Development Knowledge |
|---|---|
| item | content |
| | certain function is developed |

The contents of the items in Table 3 are as follows:

"Development knowledge name": It is a label representing the development knowledge.

"Partial function": A method for developing a certain function is described.

1-2-2-2. Behavior and state representation

The behavior and state representation in the present invention is based on the qualitative process theory by K. D. Forbus, as described above.

In the qualitative process theory, the physical world is described with a "physical phenomenon" as a unit. A physical behavior and a physical state are described by a basic frame, that is, an individual, an individual view, and a process view.

The individual corresponds to a substance described in the item 1-2-1-1. and is a label representing an object which exists in the apparatus. For example, in the example shown in FIG. 2, the paperweight and the paper are individuals.

The individual view describes the states of an individual and the relationship among individuals. For example, in the example shown in FIG. 2, the individual view describes the presence of parameters representing states such as the weight W, the volume V and the density D in the paperweight, and the relationship of $D=W/V$ among the parameters.

The process view describes a physical phenomenon occurring on the state description constituted by the individual and the individual view. For example, the free drop motion, the discharge phenomenon and the like are respectively process views. The individual view and the process view are described by the occurrence condition and the effect after the occurrence.

The individual, the individual view and the process view shall be generally referred to as a "view" in this specification.

A physical feature is a knowledge which is a combination of phenomena frequently appearing at the design time and the maintenance time. One physical feature is represented and named as a network of the above described view.

In the present invention, a physical feature database collected on the basis of physical experience is utilized. Corresponding behaviors shall be described as a realization feature in function knowledges which can correspond to a feature in this database out of the above described function knowledges, while no realization feature shall be described in function knowledges which do not correspond thereto.

Figure 4:
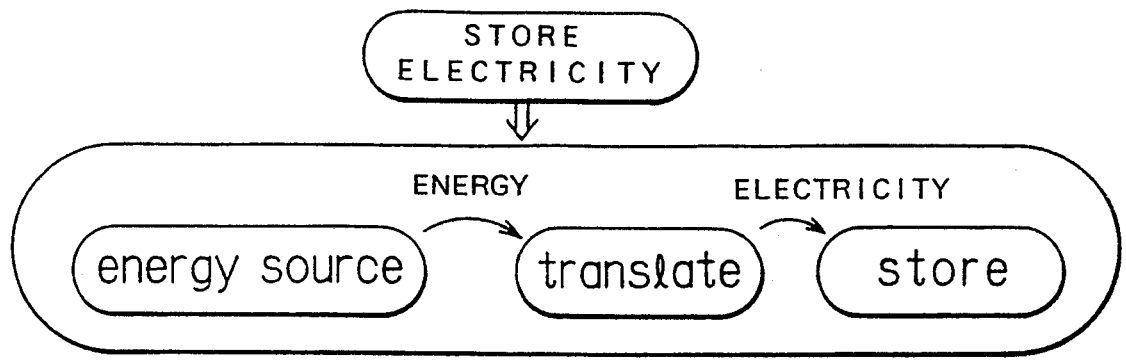
FIG. 4 is a diagram showing a method of writing development knowledges of a function "store electricity"

A concrete example of writing will be described with reference to FIGS. 4 and 5. FIG. 4 shows development knowledges of a function "store electricity". The development knowledges are so constructed that energy is outputted by a function "energy source", energy is translated into electricity by a function "translate", and electricity is stored by a function "store".

Figure 5:
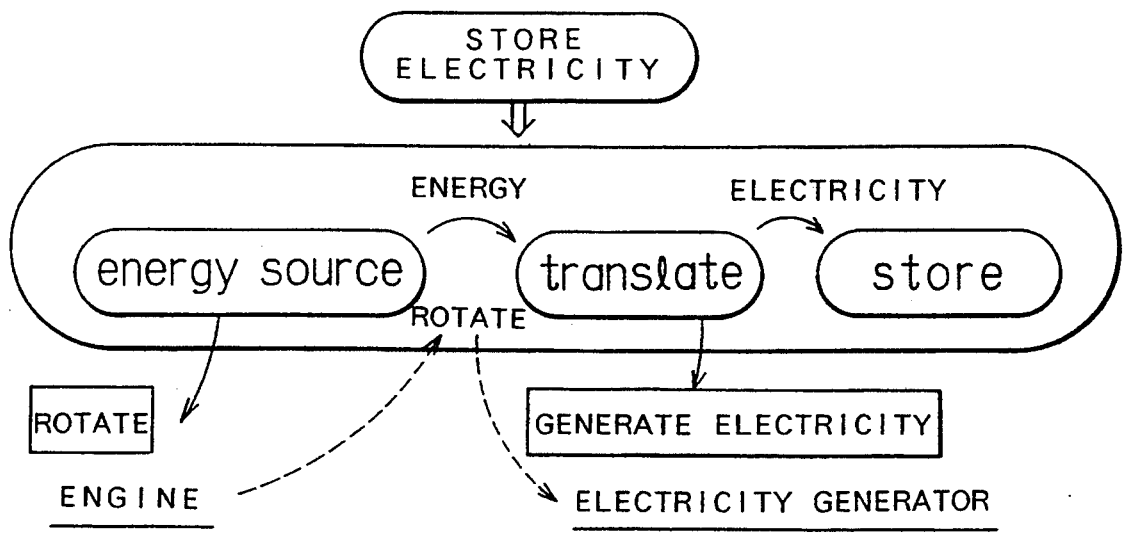
FIG. 5 is a diagram showing a method of writing a function knowledges "store electricity" in a substantiated manner.

If the development knowledges shown in FIG. 4 are previously prepared, it is determined that the function "energy source" is realized by a rotation phenomenon of an engine, and a physical feature for realizing each partial function is selected, a functional hierarchy shown in FIG. 4 is substantiated as shown in FIG. 5.

Specifically, the function "energy source" is realized by an engine, and the function "translate" is realized by an electricity generator.

1-2-2-3. Description of Object

On the FBS diagram, a model M of an apparatus is defined as the following equation (7) using a hierarchical structure network $n_f$ at a functional level, a view network $n_{bs}$ at a behavior and state level, and a set of relationships $R_{fb}$ between functions and behaviors.

$$M = <n_f, n_{bs}, R_{fb}> \quad (7)$$

The relationships $R_{fb}$ between functions and behaviors relate a function node to a feature realizing the function node.

The hierarchical structure network $n_f$ and the prototype network $n_{bs}$ are respectively defined as the following equations (8) and (9):

$$n_f = <F, R_f> \quad (8)$$

$$n_{bs} = <V, R_p, C> \quad (9)$$

As expressed by the equation (8), the function hierarchical network is constituted by function knowledges F and the relationship among the function knowledges $R_f$. $R_f$ is the order relationship among the development knowledges and the relationship having the same object at the same hierarchical level.

Furthermore, as expressed by the equation (9), the view network $n_{bs}$ at the behavior and state level is described by a set of views V, a set of dependent relationships among views $R_p$, and a set of boundary conditions C representing the conditions such as the on-off condition of a switch and the initial condition of the value of each parameter.

The following two types of information are further added to the representation of a certain apparatus based on the describing method.

"Holding condition tag": It must be generally judged whether or not a function having no realization feature holds. Therefore, the realization condition of the function in a certain object shall be written as a tag in a function node. As one example, a function "store electricity" in an automobile is developed when "power parameters of a battery are plus".

"Premise tag": An apparatus is provided with several switches for switching states. The state of the apparatus is changed by the switches. This is an operation mode. Adding a functional redundancy system is newly adding the operation mode to the apparatus. In the sense, the operation mode must be represented. In this case, inputs of the switches for switching the operation mode shall be affixed to the function node as a premise tag. When behavior simulation is done with respect to a certain functional mode, the contents of the tag are inputted as the initial condition.

1-2-2-4. Example of representation of actual apparatus using FBS diagram

Figure 6:
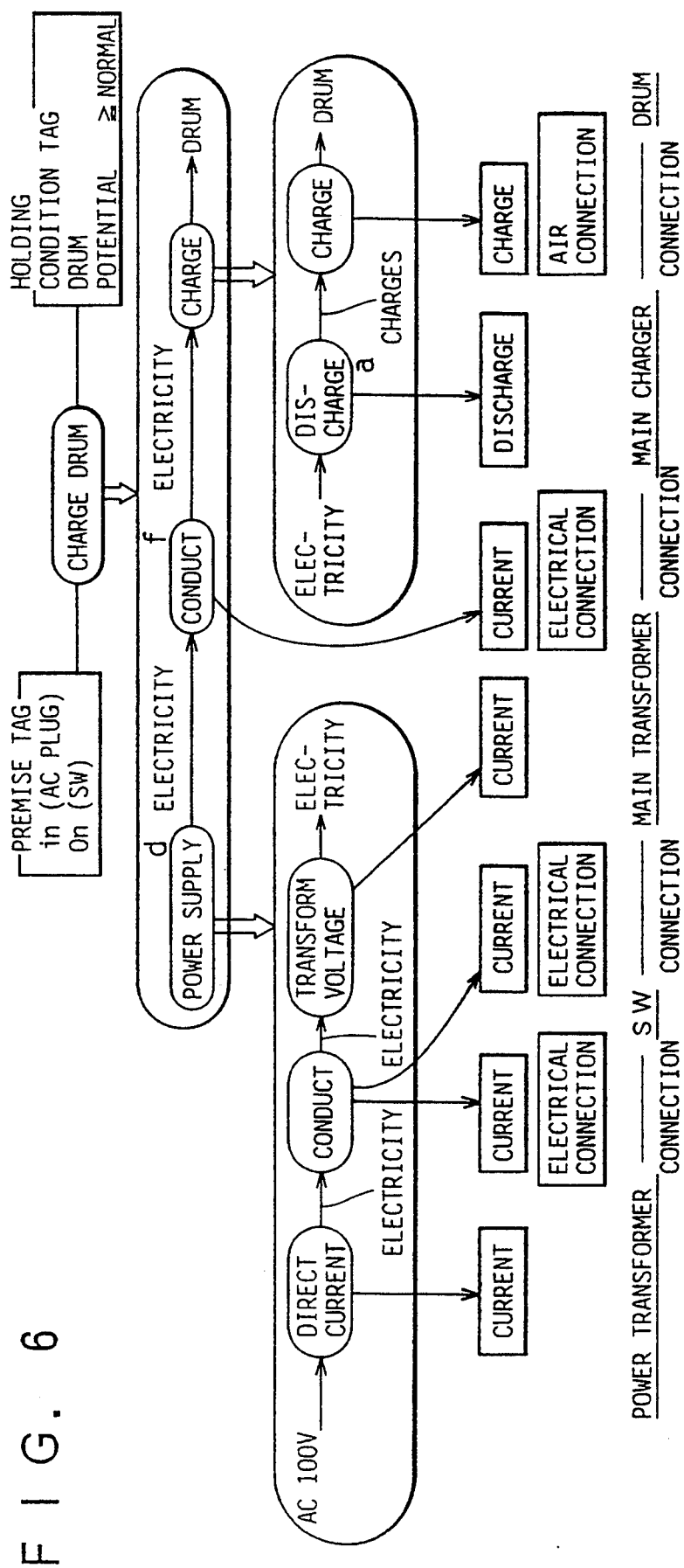
FIG. 6 is a diagram showing one example of an FBS diagram representing a function "charge" in an electrophotographic copying machine.

FIG. 6 shows an example in which a part of an actual apparatus is represented using an FBS diagram. FIG. 6 is an example of the FBS diagram representing a function "charge a photosensitive drum" realized by an electrophotographic copying machine.

1-2-3. Utilization of FBS diagram

As described in the foregoing, in an FBS diagram, an apparatus is represented by a hierarchical structure of a function understood by a human being and behaviors and states realizing the function, as shown in, for example, FIG. 6. Therefore, the FBS diagram has the following characteristics.

(1) The relationship between functions and behaviors is inherently in a many-to-many correspondence. However, the relationship can be clearly represented. Therefore, it is possible to represent functional redundancy on this representation.

(2) The representation of functions subjectively described and the representation of behaviors and states which can be physically and objectively described can be separated from each other. Therefore, the representation at a functional level can be flexibly described. On the other hand, the physical realizability and noncontradiction can be managed at a state level.

(3) An understanding of the apparatus by a human being or an image of the apparatus at the time of concept design are functional in many cases. Such functional representation can be directly described on a computer. Accordingly, the results of inference is easy to understand by a human being.

Furthermore, the FBS diagram is used in the design phase and the operation phase of a self-repair apparatus, thereby to obtain the following characteristics:

At the design time:
(1) It is possible to draw inference for adding functional redundancy in a functional hierarchy.
(2) It is possible to derive the physical realizability of a function which is being designed and the realizing method thereof in a behavior and state hierarchy.

At the operation time:
(1) At the time of occurrence of a fault, it is possible to know which function is lost on an objective apparatus and a functional redundancy system which can cope with the lost function.
(2) In the behavior and state hierarchy, it is possible to simulate the realizability, the repair operation and the like.

1-3. Construction of functional redundancy apparatus

A functional redundancy apparatus system is constructed in the following three stages:

(1) Determination of structure of design object

First, the structure of a design object is determined, the connection among parts, the arrangement relationship among parts and the like must be determined as the stage of concept design. At this time, an operation mode which can be taken by an apparatus is simultaneously determined. On the FBS diagram, the determination of the structure corresponds to noncontradictory and sufficient determination of a functional hierarchical structure and a network at a behavior and state level.

(2) Determination of abstract control sequence of objective apparatus

The boundary conditions of switches required to develop a function are found on the basis of the abstract structure determined in the item (1). An example is "When a photosensitive drum passes through a principal charging portion, the photosensitive drum must be principally charged". On the FBS diagram, this corresponds to arrangement of premise tags in the order of time such that the function of the whole apparatus can be developed.

(3) Determination of parameters

The quantitative values of parameters described in the abstract structure and control sequence of the apparatus determined in the items (1) and (2) are determined. Specifically, the size of the photosensitive drum, an output of the power supply and the like are determined.

The apparatus is constructed from the foregoing. However, the construction of the functional redundancy apparatus will be mainly described with respect to the item (1). The reason for this is that the stages described in the items (2) and (3) are carried out in the same manner as those in the general design, and the stage described in the item (1) in which functional redundancy is added is a stage which characterizes a method of constructing the apparatus.

Functional redundant design is made in the following manner using as an input a design object $m^O = <n_f^O, n_{bf}^O, R_f^O>$ which is a ordinary apparatus whose concept design is terminated.

Figure 7:
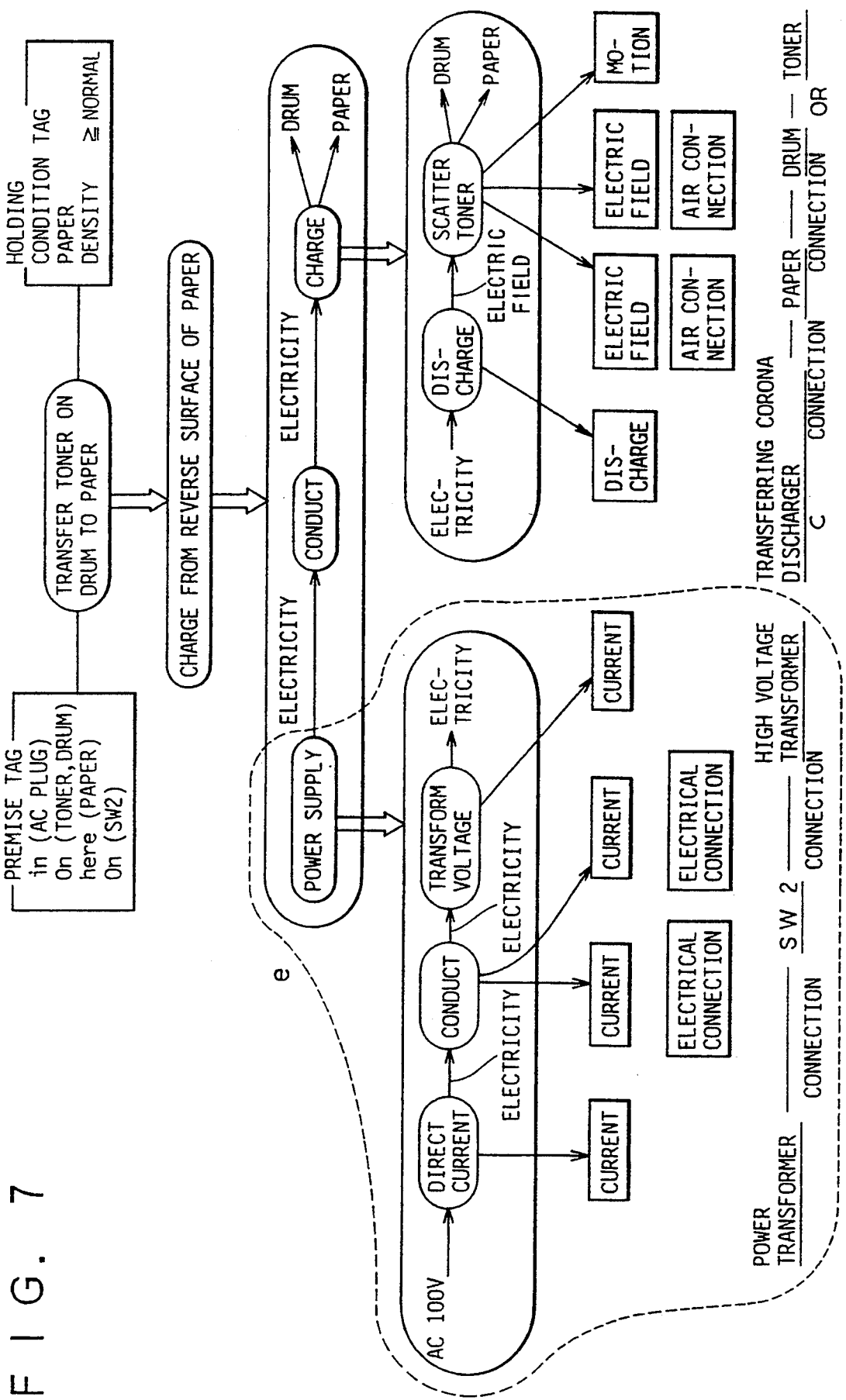
FIG. 7 is a diagram showing one example of an FBS diagram representing a function "transfer" in an electrophotographic copying machine.

As one example, FIG. 6 and a portion where a function "transfer" of an electrophotographic copying machine is realized, that is, an FBS diagram shown in FIG. 7 are used.

(1) Pay attention to a function f* of a design object to which redundancy is to be added and a functional structure $n_f^*$ A function "charge a drum" shown in FIG. 6 is paid attention to.

Figure 8:
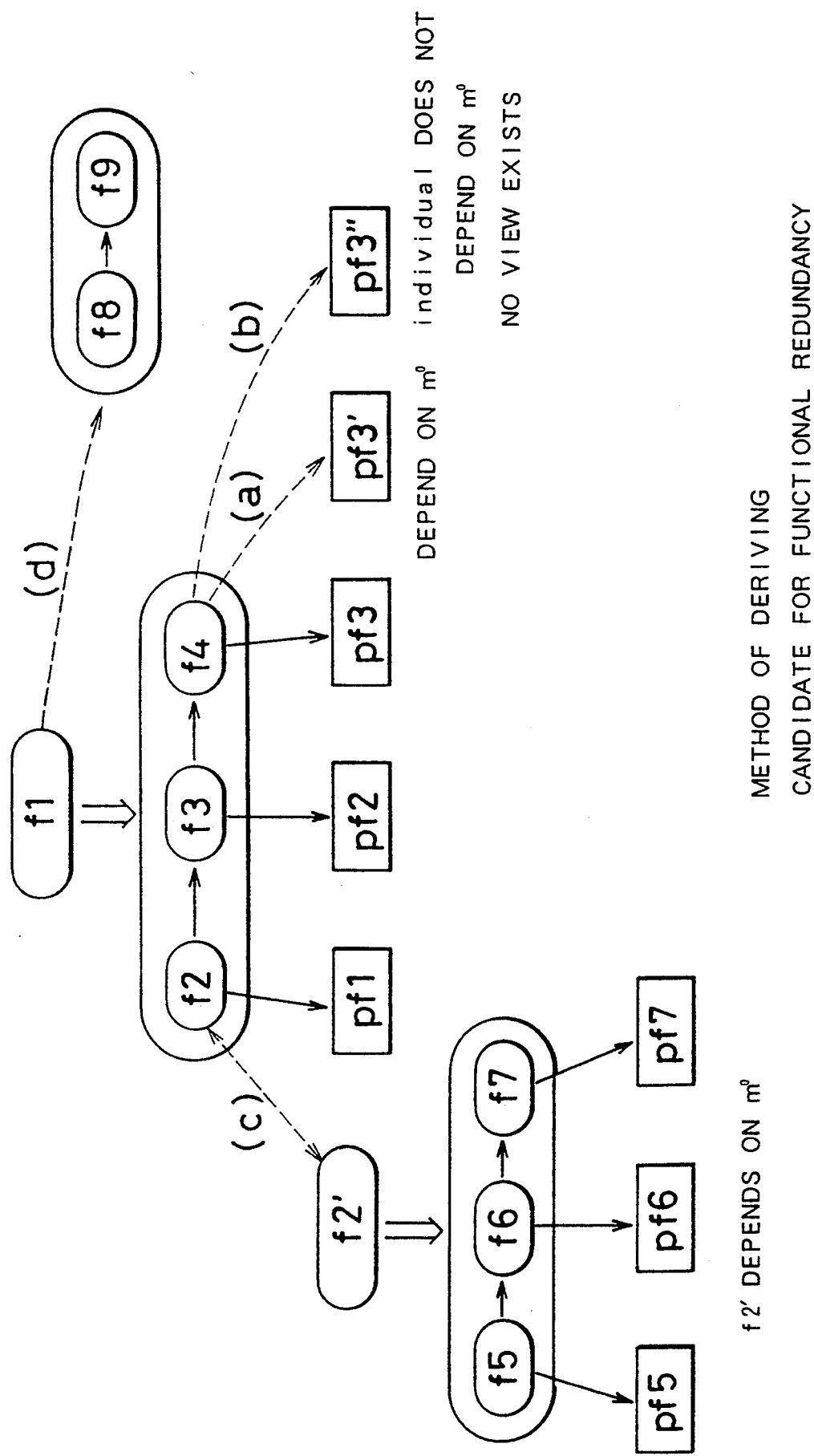
FIG. 8 is a diagram for explaining a method of deriving candidates for a functional redundancy system.

(2) Derive candidate for functional redundancy with respect to function paid attention to Candidates for functional redundancy are derived by combining the following four types of methods:

(a) Operation of FB (function-behavior) relationship (see FIG. 8 (a))

A new FB relationship is established by using the same functional hierarchical structure $n_f^*$ which is paid attention to and replacing a realization behavior of each partial function with another realization behavior of the "same type" which already exists in a model $m^O$ which is a design object. That is, a development feature of the partial function $n_{bs}^*$ is replaced with a feature $n_{bs}'$ which is in the same class but is in another instance.

In the example shown in FIG. 6, the above described replacement corresponds to the replacement of a function "discharge" indicated by a in FIG. 6 with a behavior "a discharge phenomenon on a transferring corona discharger" realizing the function "discharge" indicated by b in FIG. 7.

(b) Utilization of potential function (see FIG. 8 (b))

As in the above described item (a), the same functional hierarchical structure $n_f^*$ which is paid attention to is used, and each partial function is replaced with a potential function which can be performed by each individual in the objective model $m^O$. If an individual in a realization feature pf described in a function knowledge of a desired function f is within a behavior $n_{bs}^0$ of a design object, the individual may perform the function f as a potential function, whereby a set of f and pf becomes a candidate for functional redundancy.

In the example shown in FIG. 6, it is presumed that a transferring corona discharger indicated by c in FIG. 7 can develop a behavior "a current flows" with respect to, for example, a function "conduct electricity" in FIG. 6, that is, a function "conduct electricity" can be performed as a potential function, so that an attempt to substitute this transferring corona discharger for a function "conduct energy" is made.

(c) Operation of functional hierarchy (see FIG. 8 (c))

In a functional hierarchical structure which is paid attention to, a certain partial function is selected, and a function of the same type as the partial function is retrieved in a design object and substituted for the partial function.

In the example shown in FIG. 6, an attempt to substitute a portion subsequent to a function "generate energy" indicated by e in FIG. 7 for a function "generate energy" indicated by d in FIG. 6 is made.

(d) Construction of new functional hierarchy (see FIG. 8 (d))

In a functional hierarchical structure which is paid attention to, a function of a certain portion or the whole is paid attention to. A function knowledge of the function which is paid attention to may have a plurality of development knowledges. Therefore, development knowledges other than a development knowledge currently used are utilized to newly construct a functional hierarchical structure, and the stages described in the items (a) to (c) are carried out with respect to each of new partial functions.

In the example shown in FIG. 6, a function "conduct electricity" indicated by f is developed, and three types of partial functions, that is, "translate electricity into rotation", "transmit rotation" and "translate rotation into electricity" are developed.

By the foregoing, candidates for functional redundancy are derived.

(3) Derive realization condition with respect to candidate for functional redundancy Behaviors and substances realizing the functional hierarchical structure obtained in the above described item (2) must be brought about on a design object. Specifically, such a noncontradictory design solution $m^R$ ($m^S$ $m^R$) as to include a portion of the model $m^s = <n_f^s, n_{bs}^s, R_{fb}^s>$ derived in the item (2) must be constructed on the basis of the model $m^O$ which is a design object before improvement. $n_{bs}^O$ and $n_{bs}^s$ are compared with each other, thereby to make it possible to divide $n_{bs}^s$ into three parts, as shown in the following equation (10):

$$n_{bs}^s = n_{bs}^g \cup n_{bs}^i \cup n_{bs}^c \qquad (10)$$

$n_{bs}^g$ is a portion of a state realized on the design object (g is an abbreviation for "good"), $n_{bs}^i$ is a behavior which is not contradictory to the design object but does not satisfy the realization condition (i is an abbreviation for "inadequate"), and $n_{bs}^c$ is a portion of a state which is contradictory to the design object (c is an abbreviation for "conflict"). At this time, the realization of $n_{bs}^i$ is the condition for realizing this functional redundancy system, and contradiction between $n_{bs}^c$ and the design object is the condition of a switching mechanism which must be switched simultaneously with the switching of the inherent functional structure and functional redundancy system.

(4) Construction of apparatus satisfying realization condition

Concept design is made on the basis of the realization condition and the condition of the switching mechanism obtained in the above described item (3). The realization condition and the switching condition are individually fulfilled. Behavior simulation is done, to manage non-contradiction at a behavior and state level and inspect the realizability of a required function.

Figure 9:
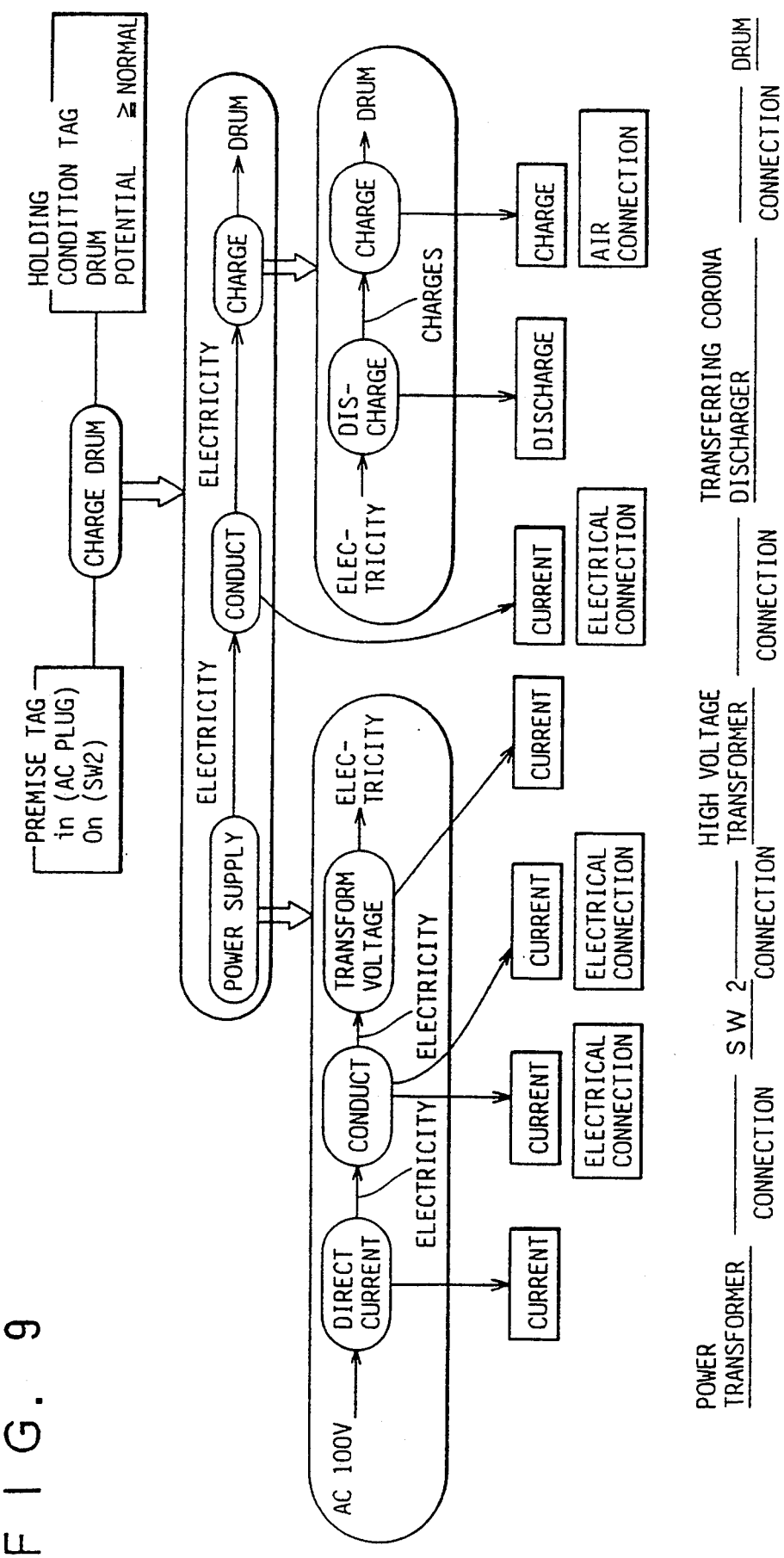
FIG. 9 is an FBS diagram showing an example of a functional redundant design solution related to a function "charge a drum" derived in accordance with the method shown in FIG. 8.

A functional redundancy system obtained as a result of the design in the concrete example taken up in FIGS. 6, 7 and 8 is shown in FIG. 9. In FIG. 9, the candidate described in the above described item (2) (a) is adopted, and an attempt to substitute the function indicated by b in FIG. 7 for the function indicated by a in FIG. 6 is made. In this case, a function "power supply" and a function "conduct electricity" shown in FIG. 7 are substituted for a function "power supply" and a function "conduct electricity" shown in FIG. 6, whereby this functional redundancy system is realized.

(5) Evaluation of candidate for functional redundancy

A candidate for functional redundancy to be adopted must be selected from a set of candidates for functional redundancy derived in the above described item (2).

In this case, the following two evaluation equations (11) and (12) are introduced:

$$\text{Redundancy } (f^*) = \frac{n(n_{bs}^R(f^*) \cap n_{bs}^0)}{n(n_{bs}^R(f^*))} \qquad (11)$$

$$\text{Robust } (f^*) = 1 - \frac{n(n_{bs}^R(f^*) \cap n_{bs}^0(f^*))}{n(n_{bs}^0(f^*))} \qquad (12)$$

In this case, Redundancy (f*) indicates the ratio of a portion to be added so as to realize a functional redundancy system (f*) which is paid attention to. It can be said that this Redundancy is more part redundant if it is close to 1, while being more functional redundant if it is close to 0. It is considered that the Redundancy (f*) is qualitatively proportional to the cost.

Furthermore, Robust (f*) indicates the degree at which a realization structure in the original design and a realization structure in the functional redundancy system do not coincide with each other with respect to the function f* which is paid attention to. It is considered that the higher this Robust (f*) is, the higher the operability of the functional redundancy system of the function f* which is paid attention to is in an objective system at the time of occurrence of a fault. It is considered that the Robust (f*) is qualitatively proportional to the reliability.

When a candidate for functional redundancy is selected, it is possible to select between one low in Redundancy (f*) or one high in Robust (f*). In either case, one candidate for functional redundancy shall be selected by the two evaluation equations. However, two evaluation parameters are not independent but are inversely proportional to each other.

Figure 10:
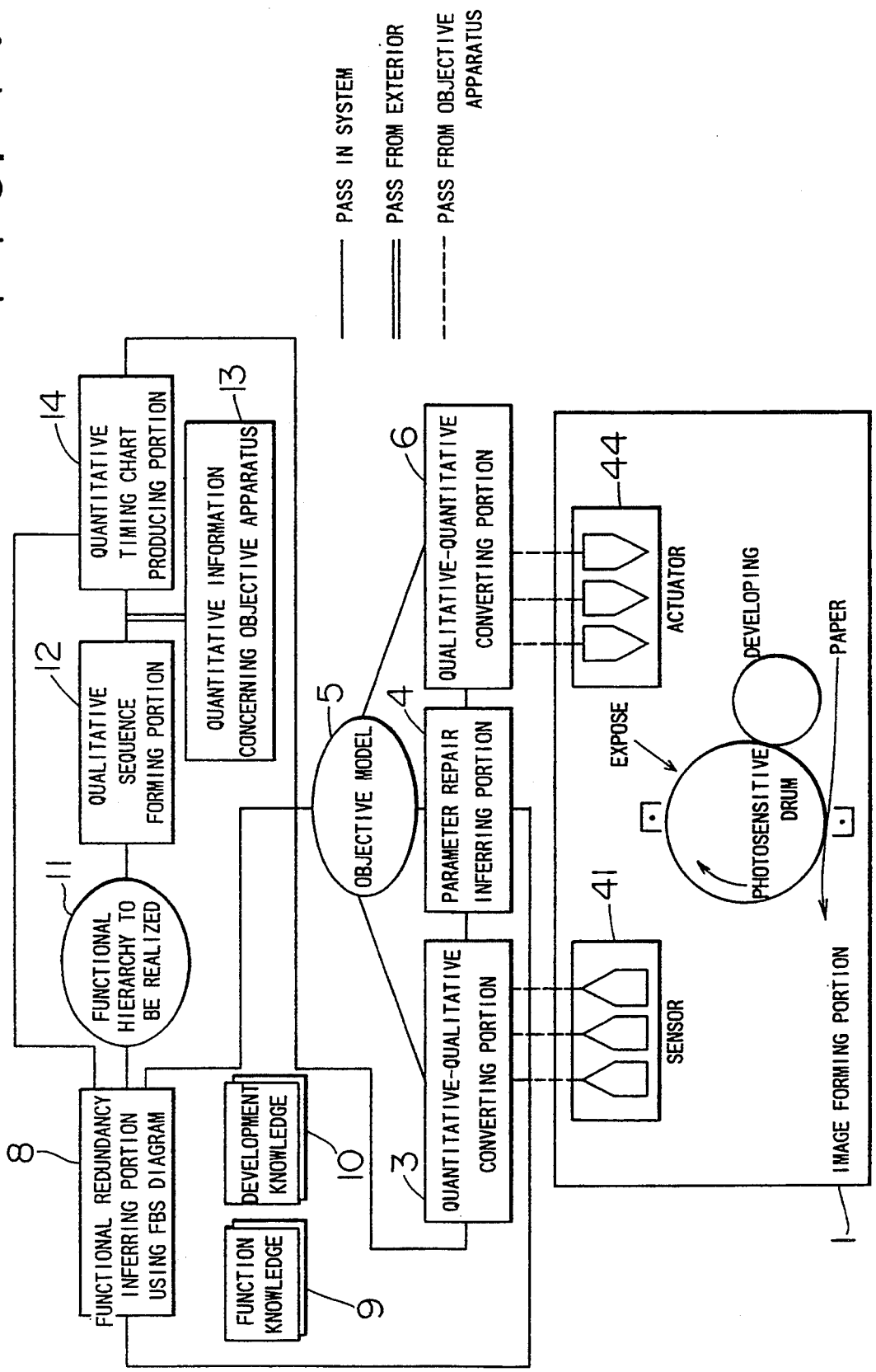
FIG. 10 is a block diagram showing the basic construction of a self-repair type image forming apparatus having a functional redundancy system and drawing sequential functional redundancy inference.

2. Concrete example of self-repair type image forming apparatus to which functional redundancy system is added 2-1. Basic construction 2-1-1. Self-repair type image forming apparatus drawing sequential functional redundancy inference FIG. 10 is a block diagram showing the basic construction of a self-repair type image forming apparatus having a functional redundancy system. The apparatus shown in FIG. 10 draws sequential functional redundancy inference every time a predetermined trigger signal, for example, a signal reporting that a fault occurs is applied from an image forming portion 1 which is an objective apparatus. In FIG. 10, a single solid line indicates a pass in a system, a double solid line indicates a pass from the exterior, and a broken line indicates a pass from the image forming portion which is an objective apparatus.

Referring to FIG. 10, the image forming portion 1 comprises an image forming mechanism of an electrophotographic type including a photosensitive drum and a developing device using toner. This image forming portion 1 comprises a plurality of sensors 41 and a plurality of actuators 44 for changing a state where an image is formed in the image forming portion 1. Data respectively detected by the plurality of sensors 41 are applied to a qualitative-quantitative converting portion 3. In the qualitative-quantitative converting portion 3, the data are converted into qualitative data. For example, they are converted into data representing symbols "normal", "high" and "low". The data are thus converted into qualitative data symbolized, thereby to make it easy to make an approach to fault diagnosis and repair diagnosis.

The symbol data obtained by the conversion in the qualitative-quantitative converting portion 3 is applied to a parameter repair inferring portion 4. In the parameter repair inferring portion 4, the fault diagnosis and a repair plan are inferred. When inference is drawn in the parameter repair inferring portion 4, qualitative data common to image forming apparatuses which is stored in an objective model 5 (the details thereof will be described later) is referred to. In carrying out the repair plan inferred, the data is converted into quantitative data in a qualitative-quantitative converting portion 6, to be selectively applied to the plurality of actuators 44. Correspondingly, the plurality of actuators 44 are driven on the basis of a signal applied, to perform repair work.

If it is judged that parameter repair cannot be carried out as a result of inferring the repair plan by the parameter repair inferring portion 4, functional redundancy inference is drawn. The functional redundancy inference is started by the application of, for example, a trigger pulse to a functional redundancy inferring portion 8 from the parameter repair inferring portion 4. The functional redundancy inferring portion 8 draws functional redundancy inference utilizing the above described FBS diagram. This inferring portion 8 comprises a function knowledge 9 and a development knowledge 10. The reason why the function knowledge 9 and the development knowledge 10 are externally provided for the functional redundancy inferring portion 8 is that it is considered that the function knowledge 9 and the development knowledge 10 must be high in versatility so that they are replaced with other function knowledges or the like as required, although the FBS diagram in the functional redundancy inferring portion 8 is an FBS diagram for the image forming portion 1 (for example, the FBS diagram shown in FIGS. 6 and 7 as previously described).

As a result of making the functional redundancy inference in the functional redundancy inferring portion 8, a functional hierarchy 11 to be realized is obtained. This functional hierarchy 11 is the above described one shown in FIG. 9. If the functional hierarchy 11 to be realized is obtained, the structure of the image forming portion 1 is changed. Accordingly, a control sequence required to control the image forming portion 1 after the change must be formed. Therefore, a qualitative sequence is formed in a qualitative sequence forming portion 12, and quantitative information 13 concerning an objective apparatus applied from the exterior is added to the qualitative sequence, to form a quantitative sequence in a quantitative timing chart producing portion 14.

The image forming portion 1 in which a redundancy system is developed is thus realized. It is possible to make adjustment of a state where an image is formed, that is, repair using parameters as described later, for the image forming portion 1 in which the redundancy system is developed.

2-1-2. Self-repair type image forming apparatus comprising in memory the results of functional redundancy inference for each predetermined condition In the basic construction in the above described item 2-1-1., sequential functional redundancy inference is made every time external trigger is applied from the image forming portion 1 in a case where a predetermined condition is met. However, such construction that sequential functional redundancy inference is made every time a certain condition signal is applied may be replaced with such construction that functional inference corresponding to several conditions is previously made, functional hierarchies to be realized corresponding to the conditions are previously established, and a functional hierarchy to be realized previously established is called back from a memory and utilized when a certain condition is actually generated.

Figure 11:
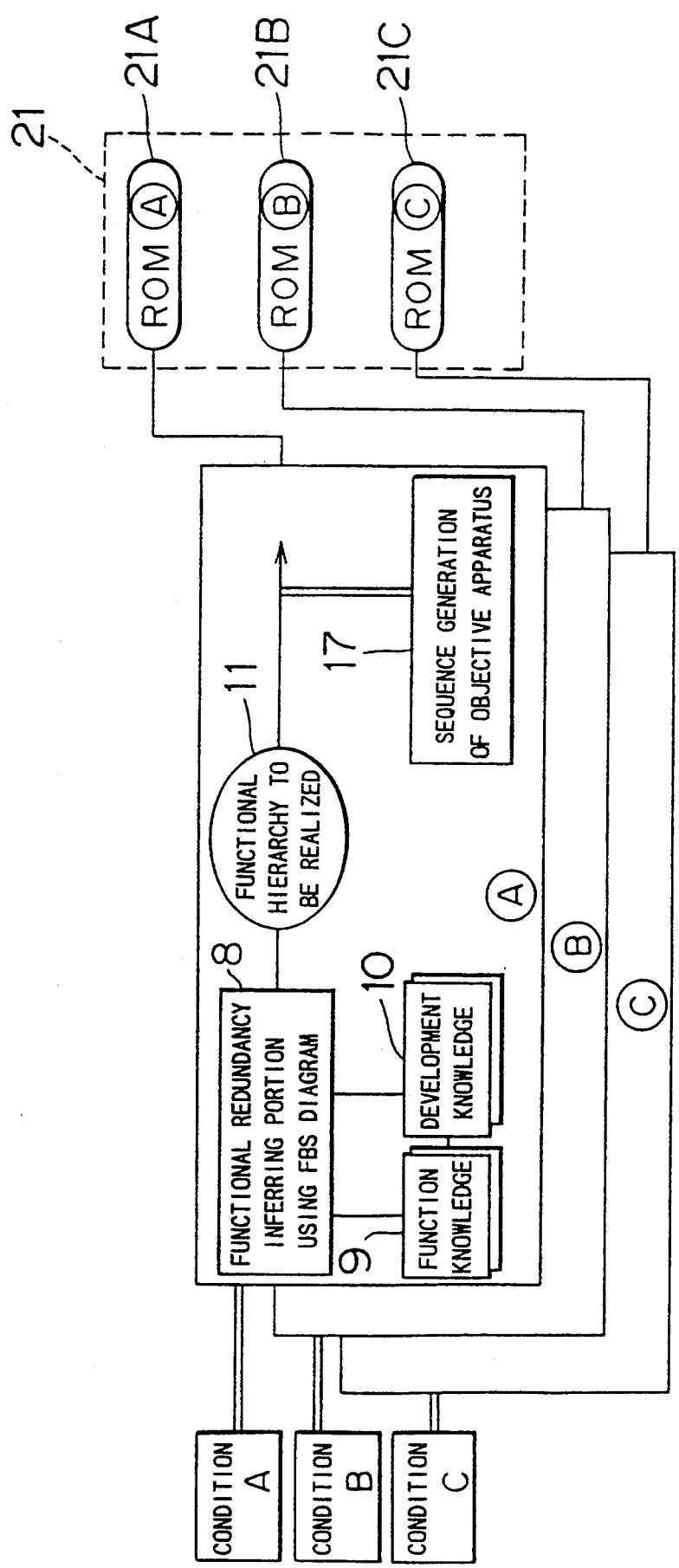
FIG. 11 is a block diagram showing the system configuration for forming a control sequence for changing a control system of an objective apparatus (a functional hierarchy and a quantitative sequence to be realized which are the results of functional redundancy inference)

FIG. 11 is a diagram showing functional hierarchy establishing processing for changing a control system of an image forming portion which is an objective apparatus.

For example, the image forming portion applies a condition A (for example, a main charger brakes down) to the functional redundancy inferring portion 8, to obtain a functional hierarchy 11 to be realized in the case by functional redundancy inference. This functional hierarchy 11 to be realized is the above described one shown in FIG. 9. In addition, a control sequence 17 of the objective apparatus is formed. The functional hierarchy 11 to be realized and the control sequence 17 of the objective apparatus are stored in a ROM (A) 21A.

Similarly, a functional hierarchy to be realized and a control sequence of the objective apparatus with respect to a condition B are stored in a ROM (B) 21B, and a functional hierarchy to be realized and a control sequence of the objective apparatus with respect to a condition C are stored in a ROM (C) 21C. Data corresponding to the plurality of conditions A, B, C, . . . are stored in the ROMs 21a, 21b, 21c, . . . and previously prepared.

Figure 12:
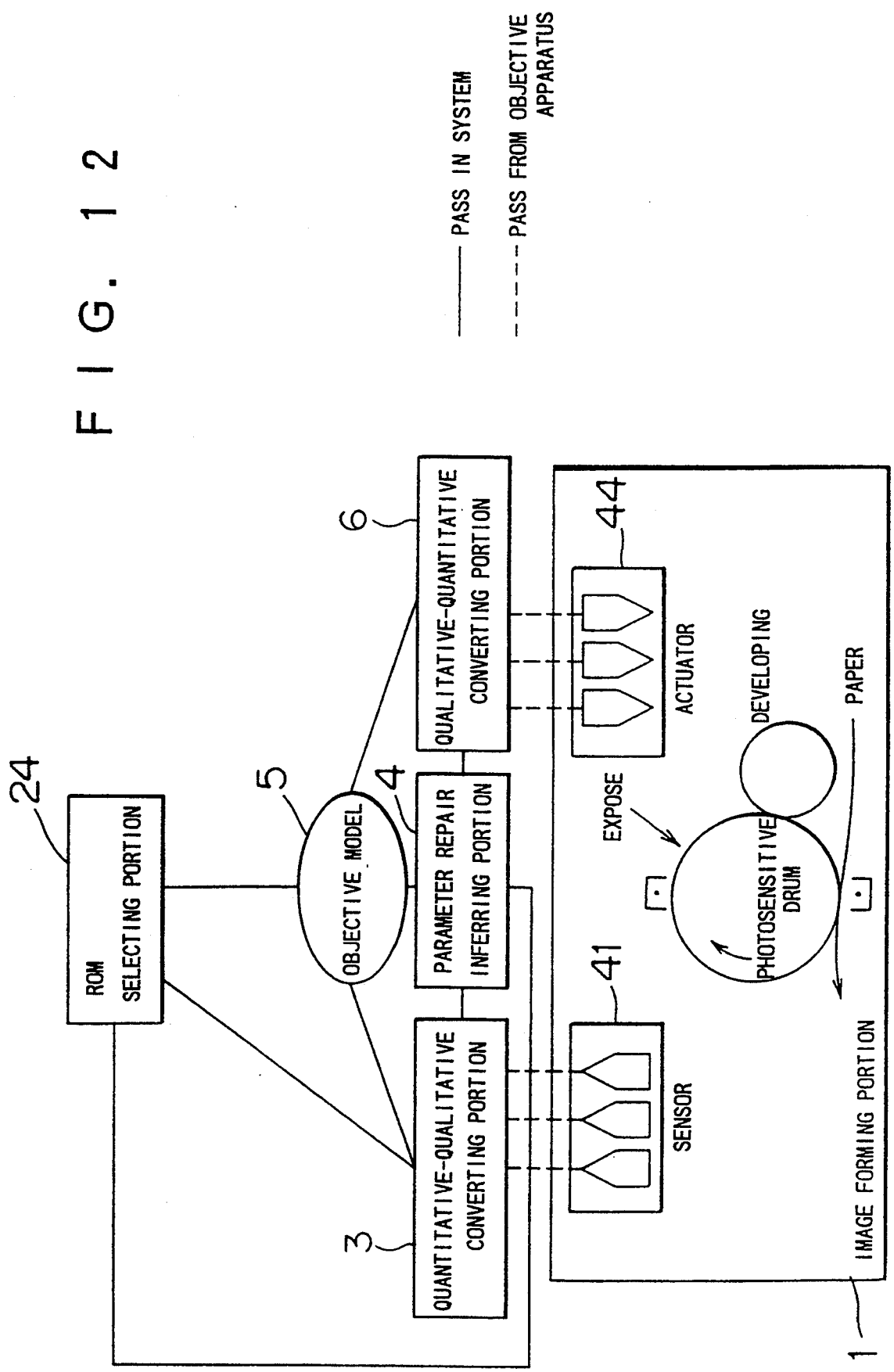
FIG. 12 is a block diagram showing the basic construction of a self-repair type image forming apparatus having a so-called simplified type functional redundancy system comprising ROMs formed by the system configuration shown in FIG. 11.

As shown in FIG. 12, a ROM selecting portion 24 comprising the ROMs is added to the apparatus. In the construction shown in FIG. 12, if it is judged that a certain condition is created in an image forming portion 1 by external trigger, a ROM corresponding to the condition created in the image forming portion 1 is selected by the ROM selecting portion 24, a functional hierarchy to be realized and a control sequence which are stored in the ROM are called back, and the image forming portion 1 is controlled by the functional hierarchy and the control sequence. In addition, parameter simulation in a case where a control ROM is replaced with another control ROM is done, to make necessary adjustment.

2-2. Concrete example using electrophotographic copying machine as objective apparatus 2-2-1. Block diagram showing control structure FIG. 13 is a block diagram showing the control structure of an image forming mechanism in an electrophotographic copying machine.

Figure 13:
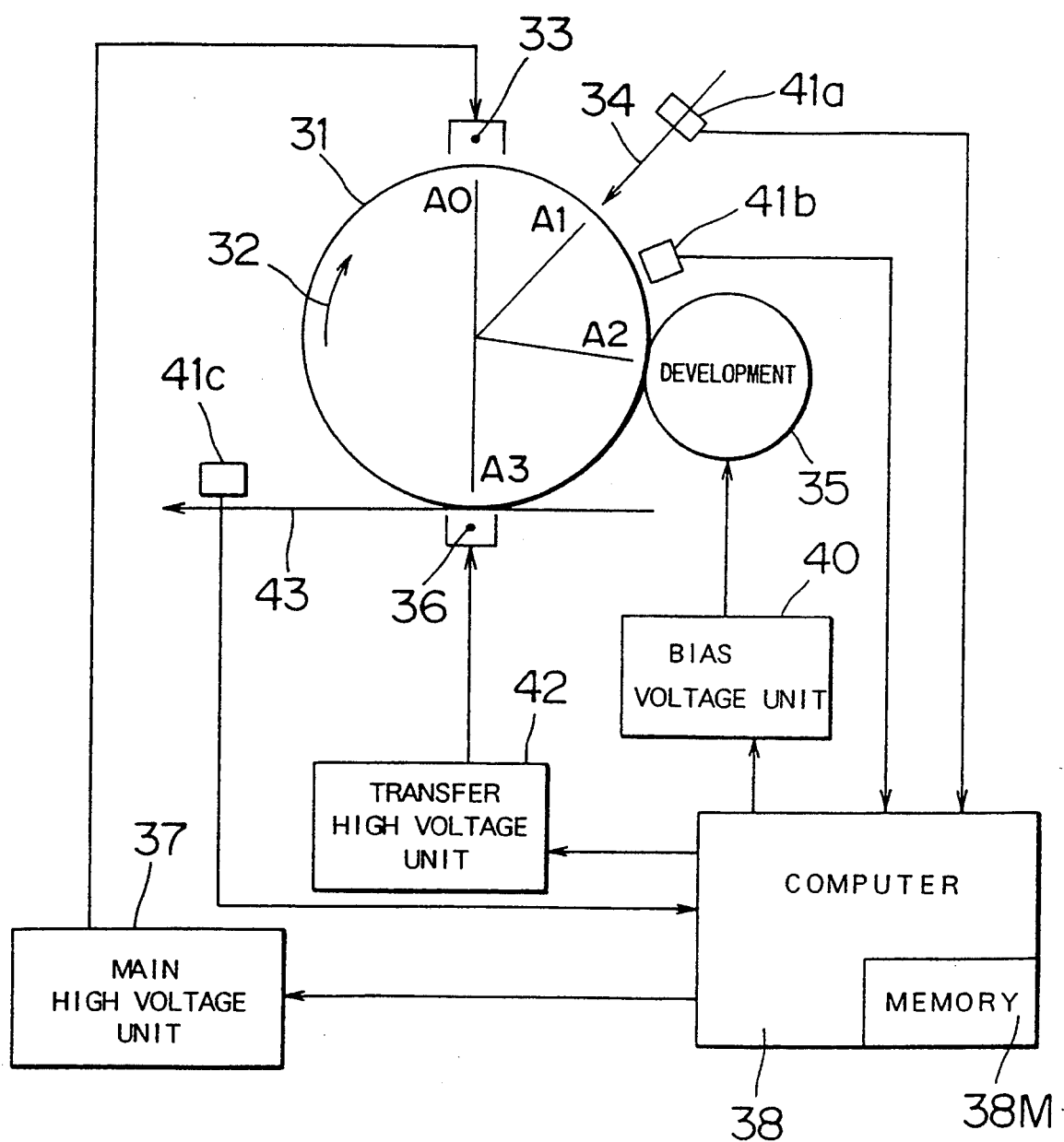
FIG. 13 is a diagram showing the control structure of an image forming mechanism in an electrophotographic copying machine.

In the control structure shown in FIG. 13, a photosensitive drum 31 is rotated at predetermined speed in the direction indicated by an arrow 32, principally charged at a drum angle A0, exposed at a drum angle A1, developed at a drum angle A2, and transferred at a drum angle A3. Therefore, a main charger 33 is arranged opposed to the drum angle A0 around the photosensitive drum 31, and original reflected light 34 is irradiated at the drum angle A1 to form an image. In addition, a developing device 35 is provided opposed to the drum angle A2, and a transferring corona discharger 36 is arranged opposed to the drum angle A3.

A high voltage is applied to the main charger 33 from a main high voltage unit 37 controlled by a computer 38. For example, a high voltage of, for example, +5.7 kV is applied to the main charger 33, so that the main charger 33 uniformly charges the surface of the photosensitive drum 31 by corona discharges.

If the photosensitive drum 31 whose surface is uniformly charged by the main charger 33 at the drum angle A0 is rotated to make the drum angle A1, the surface of the photosensitive drum 31 is exposed to the original reflected light 34. The amount of the original reflected light 34 is measured by an AE sensor 41a, to be applied to the computer 38. In addition, a surface potential of the photosensitive drum 31 which is exposed to the original reflected light 34 and from which charges charged on the exposed portion are removed is measured by a surface potential sensor 41b, to be applied to the computer 38.

Furthermore, when the photosensitive drum 31 is rotated to make the drum angle A2, development is performed by the developing device 35. At this time, a developing bias voltage of, for example, +250 V is applied by a bias voltage unit 40 to the developing device 35. The bias voltage unit 40 is placed under control of the computer 38.

Additionally, when the photosensitive drum 31 is rotated to make the drum angle A3, the computer 38 applies a driving signal to a transfer high voltage unit 42. A high voltage of, for example, +6.5 kV is applied to the transferring corona discharger 36 from the transfer high voltage unit 42, so that the transferring corona discharger transfers toner on the surface of the photosensitive drum 31 to a paper sheet 43 conveyed. The density of a toner image transferred to the paper sheet 43 is detected by a density sensor 41c, to be applied to the computer 38.

The computer 38 monitors a state where an image is formed on the basis of detected values given from the three sensors, that is, the AE sensor 41a, the surface potential sensor 41b and the density sensor 41c. Meanwhile, the internal function of the computer 38 is illustrated in FIG. 10.

2-2-2. Control sequence
2-2-2-1. Fault judgment

Figure 14:
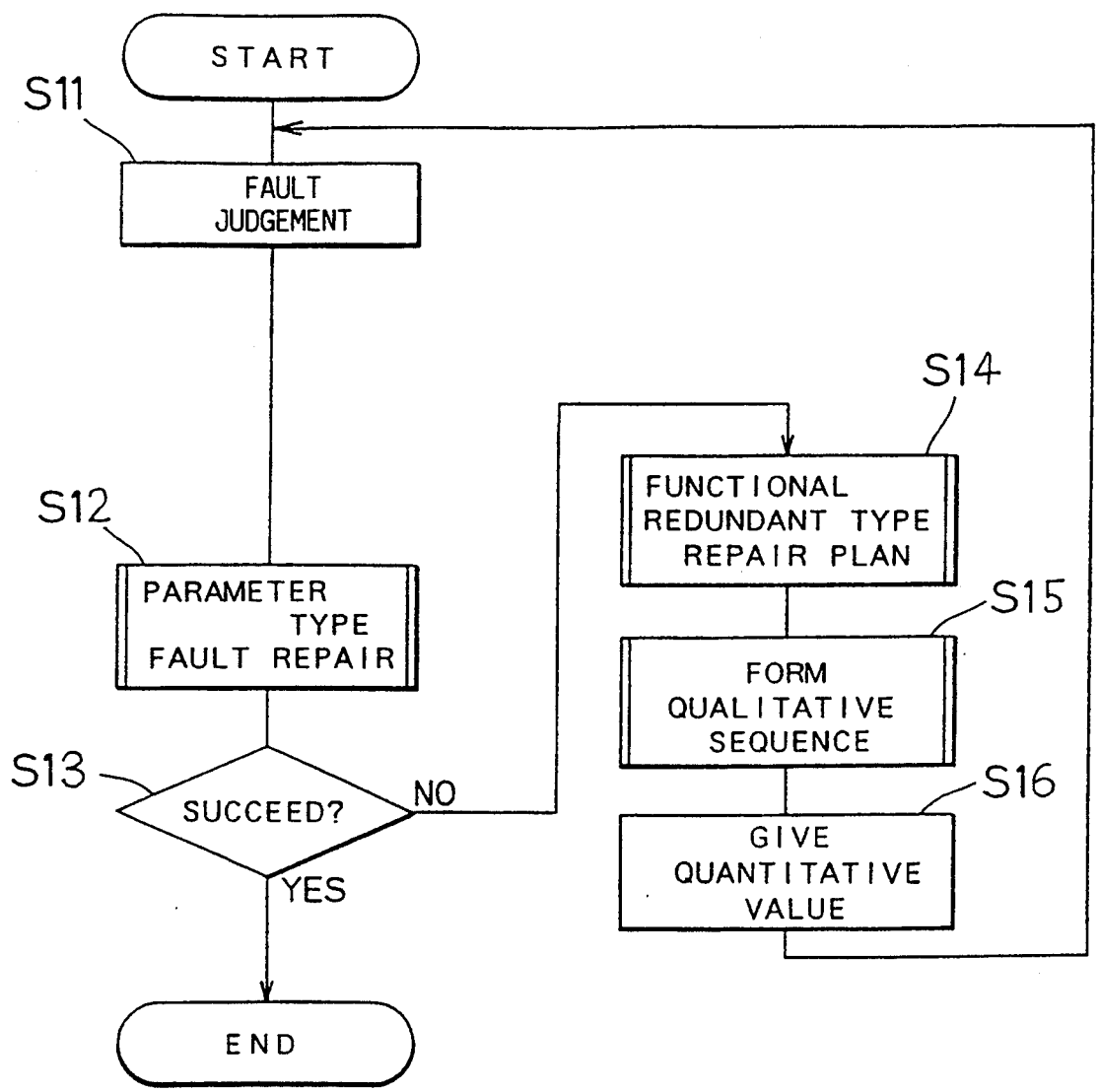
FIG. 14 is a flow chart showing the outline of fault diagnosis and repair control in a computer shown in FIG. 13.

FIG. 14 is a flow chart showing the outline of fault diagnosis and repair control in the computer 38. Description is now made in accordance with the flow of the flow chart shown in FIG. 14.

If it is judged by the computer 38 that "picture image density low" is taken up as a fault symptom, inference on the cause of the fault symptom, that is, fault judgment is made (step S11).

The fault judgment is made by converting detection data of the three sensors 41a, 41b and 41c into qualitative parameter data.

The fault judgment will be specifically described.
2-2-2-2. Substance model and objective model When the objective apparatus shown in FIG. 13 is looked at from a physical point of view, the objective apparatus is represented as a combination of a plurality of elements at a substance level, and behaviors and attributes of the respective elements as well as the combinational relationship among the respective elements are represented qualitatively using parameters, as shown in Table 4. The representation form as shown in Table 4 shall be referred to as a "substance model".

TABLE 4

| "Substance Model" |
| --- |
| exposure portion : $X = H_L - D$ |
| $X$ : logarithm of amount of original reflected light |
| $H_L$ : logarithm of amount of halogen lamp output light |
| $D$ : optical density of original |
| photosensitive portion : $V_s = V_n - \beta X$ |
| $V_s$ : surface potential after exposure |
| $V_n$ : surface potential after principal charge |
| $\beta$ : sensitivity of photosensitive member |
| development portion : $D_s = \gamma_O (V_s - V_b)$ |
| $D_s$ : toner density on drum |
| $\gamma_O$ : toner sensitivity |
| $V_b$ : bias voltage |
| output portion : $O_s = \zeta \cdot V_t \cdot D_s$ |
| $O_s$ : toner density on output paper |
| $\zeta$ : sensitivity of paper |
| $V_t$ : transfer voltage |
| separation portion : $S_p = (V_t - A_{sp}) \cdot (V_{sp} - A_{sp})$ |
| $S_p$ : adsorbing force between drum and paper |
| $A_{sp}$ : amplitude of separating AC voltage |

Figures 15, 16:
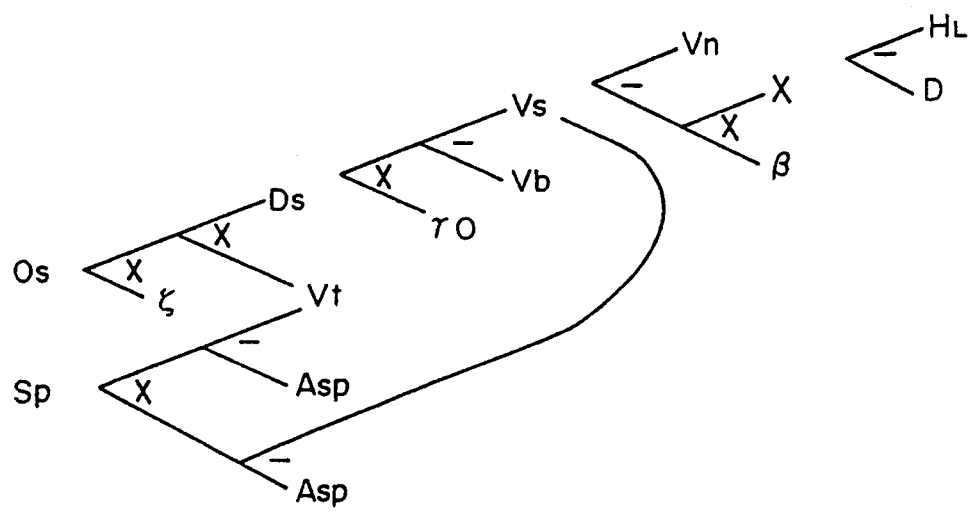
FIG. 15 is a diagram showing a mathematical model of an electrophotographic copying machine according to one embodiment of the present invention.
FIG. 16 is a diagram showing reference value data of parameters required when the respective parameters are symbolized in the electrophotographic copying machine according to one embodiment of the present invention.

Furthermore, the representation shown in FIG. 15 in which the substance model is abstracted and shown as a combined tree of the respective parameters shall be referred to as a "mathematical model".

The "substance model" and the "mathematical model" are referred to as an "objective model (qualitative model)" collectively. The "objective model" is qualitative data common to image forming apparatuses which is also made use of for fault repair as described later.

The respective contents of the substance model and the mathematical model which serve as qualitative data are stored in the memory 38M in the computer 38.

Furthermore, in the memory 38M, reference value data which are measured in plant shipment, for example, are stored with respect to a predetermined parameter out of parameters included in the substance model. This reference value data is characteristic data intrinsic to this image forming apparatus.

For example, in this apparatus, reference value data specifying the ranges of "low", "normal" and "high" are stored with respect to parameters $X$, $V_s$, $O_s$ and $V_n$, respectively, as shown in FIG. 16.

Meanwhile, in the present embodiment, the above described reference value data can be renewed in response to sensing data in the process of the later fault diagnosis and fault repair, the change in operating state of the objective apparatus, and the like.

Additionally, a functional evaluation knowledge used as an example of the fault diagnosis knowledge to be a basis for judging whether or not the objective apparatus is normally operated is stored in the memory 38M on the basis of the symbol obtained by the conversion.

Meanwhile, the functional evaluation knowledge, that is, the fault diagnosis knowledge may be one which is intrinsic to the objective apparatus or may be one which is not intrinsic thereto but is widely common to image forming apparatuses.

The functional evaluation knowledge in the present embodiment includes the following knowledges:
picture image density $O_s$ = normal
fog degree $O_s' <$ normal
separation performance $S_p <$ normal Here, when $O_s$, $O_s'$ and Sp do not meet the above described conditions, the objective apparatus is not normally operated.

Let's consider a case where digitized sensor information of the objective apparatus in a normal operation takes the following values:
  value X of the AE sensor 41a=23
  value $V_s$ of the surface potential sensor 41b=380
  value $O_s$ of the density sensor 41c=7
Furthermore, it is determined that:
  value $O_s$ of the density sensor 41c=fog degree $O_s'$ in a case where a blank original at optical density D=0 is used,
  value $V_s$ of the surface potential sensor 41b=dark potential $V_n$ in a state where a halogen lamp (not shown) is put off,
and it is assumed that the values are:
  fog degree $O_s'$=50
  park potential $V_n$=590 Meanwhile, measurements of the fog degree $O_s'$ and the dark potential $V_n$ may be made through a manual operation, or may be so programmed as to be made automatically under constant conditions, for example, whenever the power supply of the objective apparatus is turned on or before copying is started. In the present embodiment, the latter is adopted.

The values X, $V_s$, $O_s$, $O_s'$ and $V_n$ obtained by the AE sensor 41a, the surface potential sensor 41b and the density sensor 41c are respectively converted into symbols in the computer 38. The conversion is made in such a manner that the digital value given from the sensor 41a, 41b or 41c is compared with the reference value data serving as the characteristic data stored in the memory 38M, and is converted into any one of three types of symbols "normal", "high" and "low".

In the present embodiment, the respective parameters are symbolized as follows:
  X=normal
  $V_s$=low
  $O_s$=low
  $V_n$=low These respective parameters symbolized are then compared with the functional evaluation knowledge which is stored in the memory 38M. As a result, the picture image density $O_s$ is not "normal", so that it is judged that a fault occurs and its fault symptom is "picture image density low ($O_s$=low)". Fault diagnosis, that is, inference of the fault is subsequently made with "$O_s$=low" being the fault symptom.

2-2-2-3. Fault diagnosis method

Fault diagnosis is made using the mathematical model shown in FIG. 15, to retrieve parameters which may cause $O_s$=low.

Figure 17:
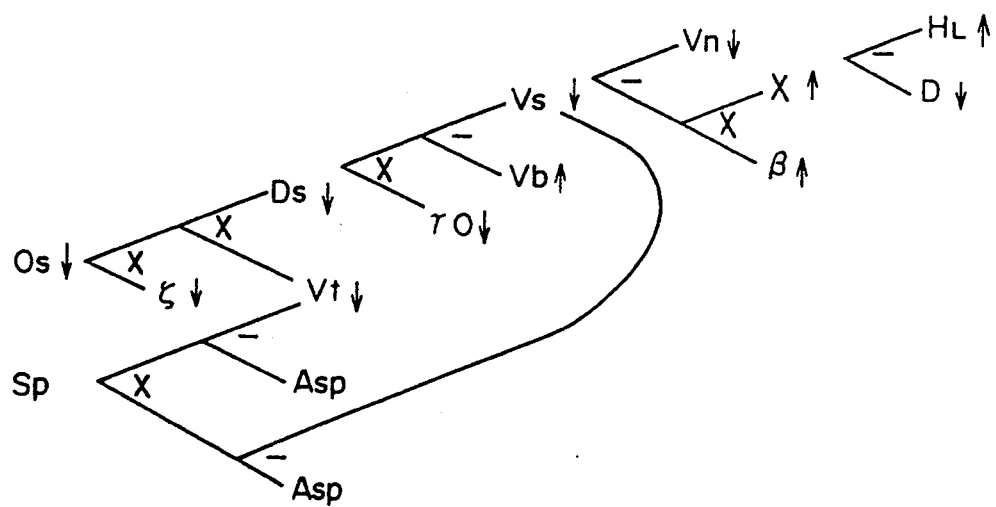
FIG. 17 is a diagram showing development for fault diagnosis on the mathematical model shown in FIG. 15.

FIG. 17 is obtained when parameters which may decrease $O_s$ are pointed out on the mathematical model shown in FIG. 15. In FIG. 17, parameters marked with upward arrows or downward arrows are parameters which may cause $O_s$=low, the parameters marked with the upward arrows causing $O_s$=low when they are increased and the parameters marked with the downward arrows causing $O_s$=low when they are decreased.

The causes of changing parameters are then detected with respect to parameters $\zeta$, $D_s$, $V_t$, $\gamma_0$, $V_b$, $V_s$, $V_n$, X, $\beta$, $H_L$ and D which might cause $O_s$=low which have been retrieved on the mathematical model.

This detection is performed on the basis of the substance model shown in Table 4. In the present embodiment, inference of the following fault candidates is drawn. Specifically:
  $V_t$=low:→defective transfer transformer
  $\zeta$=low:→deterioration of paper
  $V_b$=high:→improper development bias
  $\gamma_0$=low:→deterioration of toner
  $V_n$=low:→improper principal charge voltage
  $H_L$=high:→improper setting of halogen lamp
  D=low:→lightly printed original The knowledge mentioned on the right side of arrows "→" out of the above described fault candidates, that is, the knowledge such as "defective transfer transformer", "deterioration of paper", "improper development bias" or the like is a fault knowledge. This knowledge is included in the qualitative data common to the image forming apparatuses. $\beta$ out of the parameters is excluded because it is the sensitivity of the photosensitive member and is not increased. $D_s$, $V_s$ and X are also excluded because they are represented by the other parameters.

Simulation of the fault state is done for the above described inference. The simulation of the fault state means respectively inferring the states of the objective apparatus in cases where the above described faults inferred occur. More specifically, it is assumed that the cause of creating $O_s$=low, that is, the fault is, for example, "defective transfer transformer", to set $V_t$=low with respect to a model in a normal state. The effects exerted on the respective parameters in the state are then examined on the mathematical model.

For example, when $V_t$=low is set, $O_s$=low and Sp=low are obtained and the other parameters are all "normal", which are contradictory to $V_s$=low and $V_n$=low obtained from the sensors. Therefore, such a conclusion is drawn that the inference of the fault is in error.

Similarly, $\zeta$=low is set on the mathematical model in the normal state, and the results thereof are compared with the symbols obtained from the sensors. Also in this case, contradiction is found because $V_s$=normal and $V_n$=normal are obtained on the mathematical model, while $V_s$=low and $V_n$=low are obtained from the sensors. Accordingly, it is judged that the inference of the fault is in error.

Simulation of the fault states is thus done with respect to all the fault candidates, to confirm whether or not the inference of the fault is right.

As a result, in the present embodiment, such conclusion is drawn that the results which coincide with the actual state of the objective apparatus are obtained if the fault is "improper principal charge voltage ($V_n$=low)" and the other fault candidates are all contradictory to the actual state of the objective apparatus.

Accordingly, it is possible to conclude that the fault in this case is "improper principal charge voltage". The conditions of the respective parameters of the objective apparatus at that time are as shown in Table 5.

TABLE 5

| Improper Principal Charge Voltage | | |
| --- | --- | --- |
| $H_L$ = normal | $V_b$ = normal | $A_{sp}$ = normal |
| D = normal | $\gamma_O$ = normal | $S_p$ = low |
| X = normal | $D_s$ = low | |
| $\beta$ = normal | $V_t$ = normal | |
| $V_n$ = low | $\zeta$ = normal | |
| $V_s$ = low | $O_s$ = low | |

Figure 18:
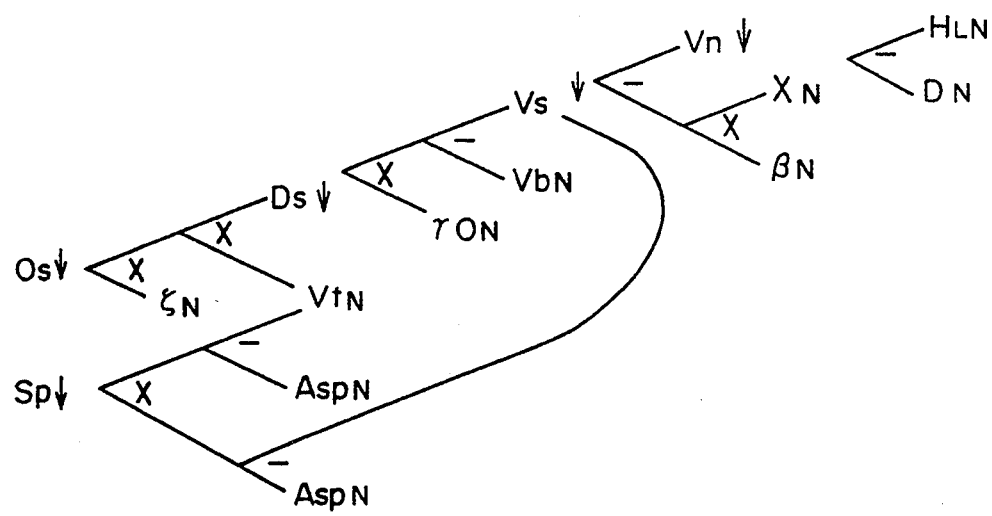
FIG. 18 is a diagram showing development for fault diagnosis on the mathematical model shown in FIG. 15.

FIG. 18 is obtained when the conditions of the parameters shown in Table 5 are traced on the mathematical model. In FIG. 18, a downward arrow, an upward arrow, and N which are marked on the right side of the parameters respectively indicate "low", "high", and "normal".

The fault judgment can be also made using a functional hierarchical network in place of the foregoing method. Specifically, the fault judgment is realized by comparing the holding condition of a function (functional evaluation knowledge) which is positioned in the highest order on a functional hierarchical network of the objective model with a sensor value. For example, in the present embodiment, the sensor value is applied to a holding condition tag "drum potential≧normal" of the most significant function "charge a drum", thereby to judge, for example, that a charging function does not hold, that is, a fault occurs.

2-2-2-4. Functional redundancy inference

Parameter type repair work is then performed on the basis of the results of the fault judgment in the step 11 shown in FIG. 14 (step S12). As a result, it is judged whether or not the parameter type repair work succeeded depending on whether or not a parameter value is returned to a value in the normal range (step S13). If the parameter type repair work succeeded, fault repair processing performed this time is terminated. The parameter type repair work described herein may be performed as disclosed in the specification of Japanese Patent Laid-Open Gazette No. 252191/1990 and the specification of Japanese Patent laid-Open Gazette No. 250043/1991 which are the prior applications of the inventors of the present application.

The parameter type repair work in the step S12 is roughly performed in the following procedure.

As a result of the parameter type fault judgment, "picture image density low ($O_s$=low)", for example, is taken up as a fault symptom. Consequently, a parameter operation must be so performed as to repair this symptom "picture image density low". That is, the target of the repair is to increase $O_s$.

Therefore, such inference can be drawn from the relationship on the mathematical model shown in FIG. 15 that $O_s$ can be increased, which is the target of the repair, by increasing $D_s$, by increasing $V_t$, or by increasing $\zeta$.

When the inference is then drawn with increasing $D_s$ as the target, any one of such conclusions is obtained that $V_s$ is increased, $V_b$ is decreased, and $\gamma_0$ is increased. It is thus possible to obtain on the mathematical model candidates for a repair operation by repeating the inference on the basis of the mathematical model. The obtained results are shown in Table 6.

TABLE 6

| | |
|---|---|
| $H_L$ = decrease | $V_b$ = decrease |
| D = increase | $\gamma_O$ = increase |
| X = decrease | $D_s$ = increase |
| $\beta$ = decrease | $V_t$ = increase |
| $V_n$ = increase | $\zeta$ = increase |
| $V_s$ = increase | |

Meanwhile, some repair candidates obtained on the basis of the mathematical model may be realized, whereas others may not be realized. For example:

D: Optical density of original cannot be altered, and $\beta$: Sensitivity of photosensitive member is also difficult to alter.

$\gamma_0$: Sensitivity of toner is neither alterable, and $\zeta$: Sensitivity of paper is nor alterable.

Furthermore, in this concrete example, $V_b$: Bias voltage is not also alterable because there is no actuator. It goes without saying that $V_b$ is made alterable by adding an actuator.

Additionally, the following are not made alterable but are only indirectly altered by altering another parameter and thus, are excluded from the repair candidates:

X: Logarithm of amount of original reflected light $V_s$: Surface potential of drum after exposure $D_s$: Toner density on drum Meanwhile, the following, which is not directly related in this concrete example, can be altered by adding an actuator:

$A_{sp}$: Amplitude of separating AC voltage

In the above described manner, the following are taken up as the repair candidates in this concrete example:

$V_t$: Transfer voltage $V_n$: Surface potential after principal charge $H_L$: Logarithm of amount of halogen lamp output light On the other hand, the following knowledges are previously stored as the repair plan knowledge in the memory 38M in the computer 38. Specifically:

(a) $V_t$ is increased.→The control voltage of the transfer high voltage unit 42 is increased.

(b) $V_t$ is decreased.→The control voltage of the transfer high voltage unit 42 is decreased.

(c) $V_n$ is increased.→The control voltage of the main high voltage unit 37 is increased.

(d) $V_n$ is decreased.→The control voltage of the main high voltage unit 37 is decreased.

(e) $H_L$ is increased.→The halogen lamp control signal is shifted to the high voltage side.

(f) $H_L$ is decreased.→The halogen lamp control signal is shifted to the low voltage side.

The repair plan knowledge is characteristic data intrinsic to this apparatus. By applying the repair plan knowledge to the repair candidates obtained on the basis of the mathematical model, the following three methods are obtained as the repair operation for increasing $O_s$:

(a) $V_t$ is increased.→The control voltage of the transfer high voltage unit 42 is increased.

(c) $V_n$ is increased.→The control voltage of the main high voltage unit 37 is increased.

(f) $H_L$ is decreased.→The halogen lamp control signal is shifted to the low voltage side.

Accordingly, any one of the three methods is carried out.

Furthermore, it is more preferably considered that the objective apparatus experiences various secondary effects by increasing the image density $O_s$. Inference of the secondary effects is made on the basis of the mathematical model, to judge which of the above described three methods (a), (b) and (c) is the most suitable. The inference of the secondary effects is the same as inference made after a functional redundancy system as described later is developed and hence, the description thereof is omitted herein.

On the other hand, when the parameter type repair processing did not succeed (NO in the step S13), a functional redundant type repair plan according to the present invention is carried out (step S14). If the above described fault is, for example, "a main charger breaks down", parameter type fault repair is impossible, whereby the functional redundant type repair plan in the step S14 is carried out.

Figure 19:
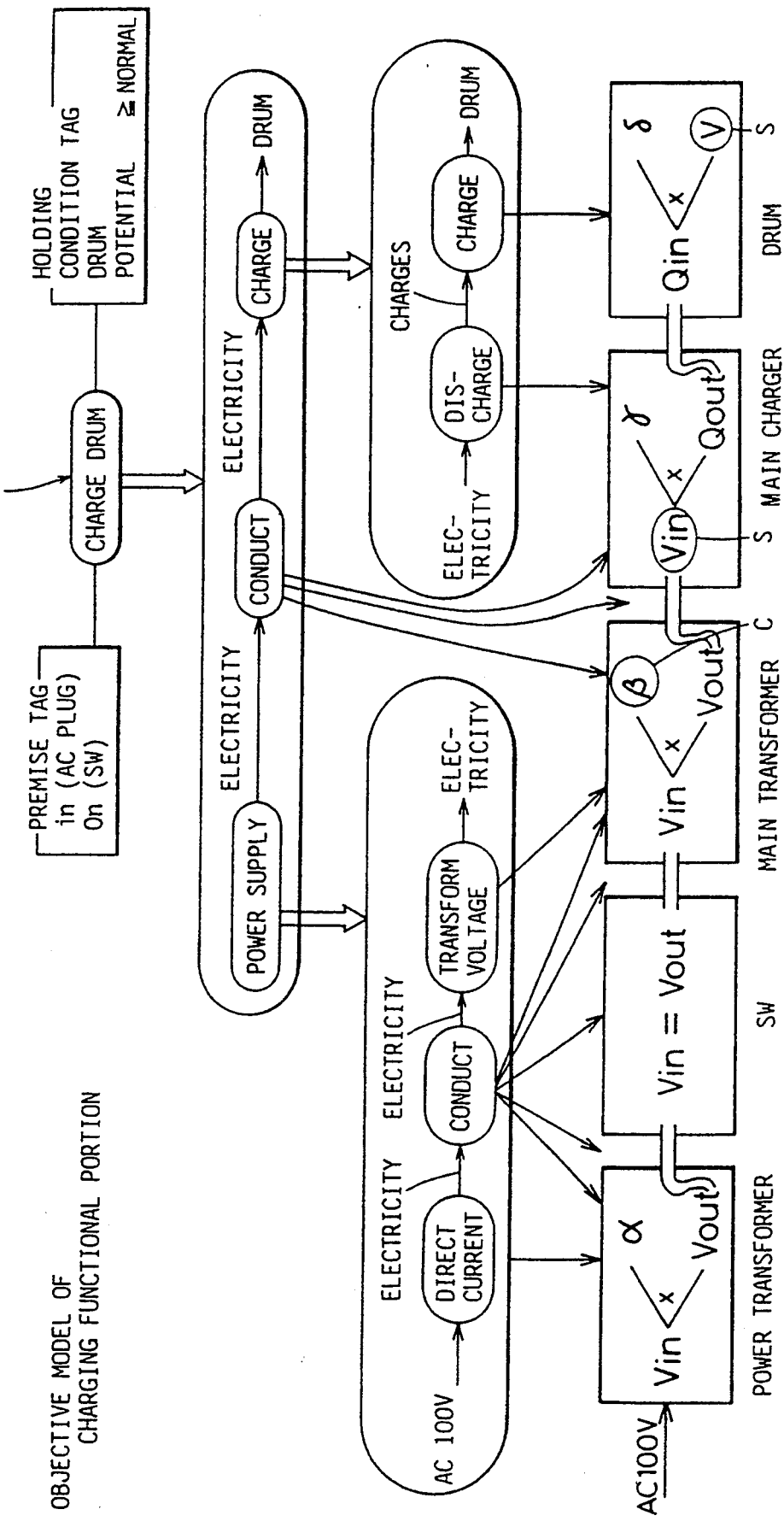
FIG. 19 is a diagram showing an FBS diagram of a charging functional portion simplified for convenience of illustration.
Figure 20:
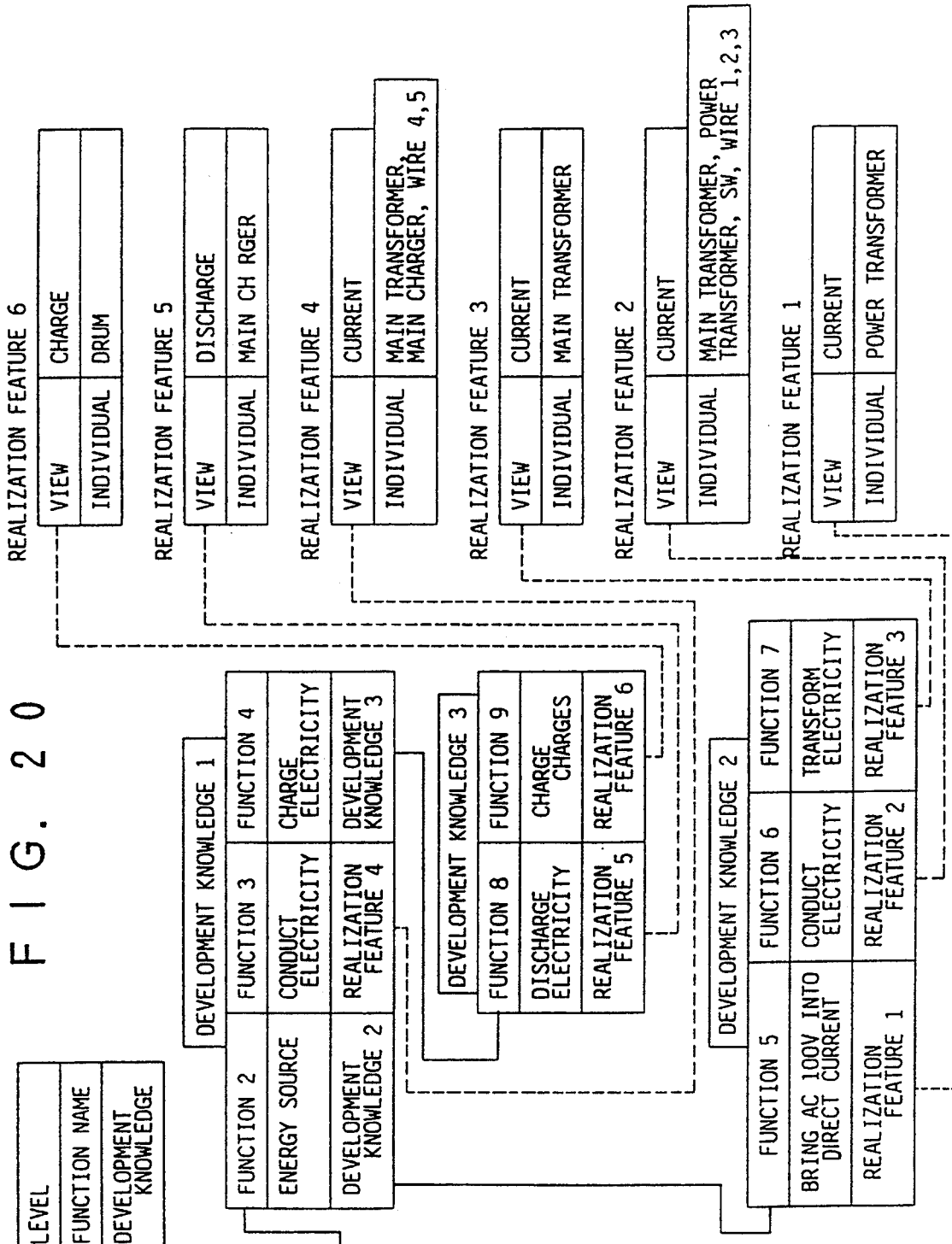
FIG. 20 is a diagram showing the contents of a knowledge related to a charging function of a photosensitive drum and development knowledges.

As a premise for carrying out the functional redundant type repair plan, an FBS diagram using as an objective model a charging functional portion is stored in the memory 38M in the computer 38. FIG. 19 shows the FBS diagram of the charging functional portion simplified for convenience of illustration. In addition, FIG. 20 shows the contents of a function knowledge and development knowledges with respect to a charging function of the photosensitive drum. In FIG. 20, a function name "charge a drum" is described in a label "Function 1", and a development knowledge 1 is described therein. In addition, "a power plug is inserted and a power switch is turned on" is described as a premise tag, and "drum potential $\geq$ normal (reference potential)" is described as a holding condition tag. The function knowledge is so developed as to construct a hierarchical structure on the basis of the development knowledge 1. That is, the development knowledge 1 indicates respective labels "Function 2", "Function 3" and "Function 4", and "Function 2" and "Function 4" are respectively developed into development knowledges 2 and 3. In addition, a function name "conduct electricity" is described in "Function 3", and "a realization feature 4: view=current, individual=main transformer, main charger and wires 4 and 5" is described as its realization feature. Such a developing method follows a method of realizing the FBS diagram previously described.

The computer 38 retrieves a charging function substituted for the main charger 33 so as to charge the photosensitive drum 31 on the basis of the FBS diagram, the function knowledge and the development knowledges shown in FIGS. 19 and 20 which are stored in the memory 38M. That is, a candidate for functional redundancy in a function lost by a fault "charging function" is retrieved. If no candidate for functional redundancy can be found, the repair plan fails in this stage.

On the other hand, if a candidate for functional redundancy can be found, a redundancy system including no fault derived in a fault diagnosing portion is selected as its redundancy system. As a result, in the present embodiment, the transferring corona discharger 36 is selected as a functional redundancy system.

Figure 21:
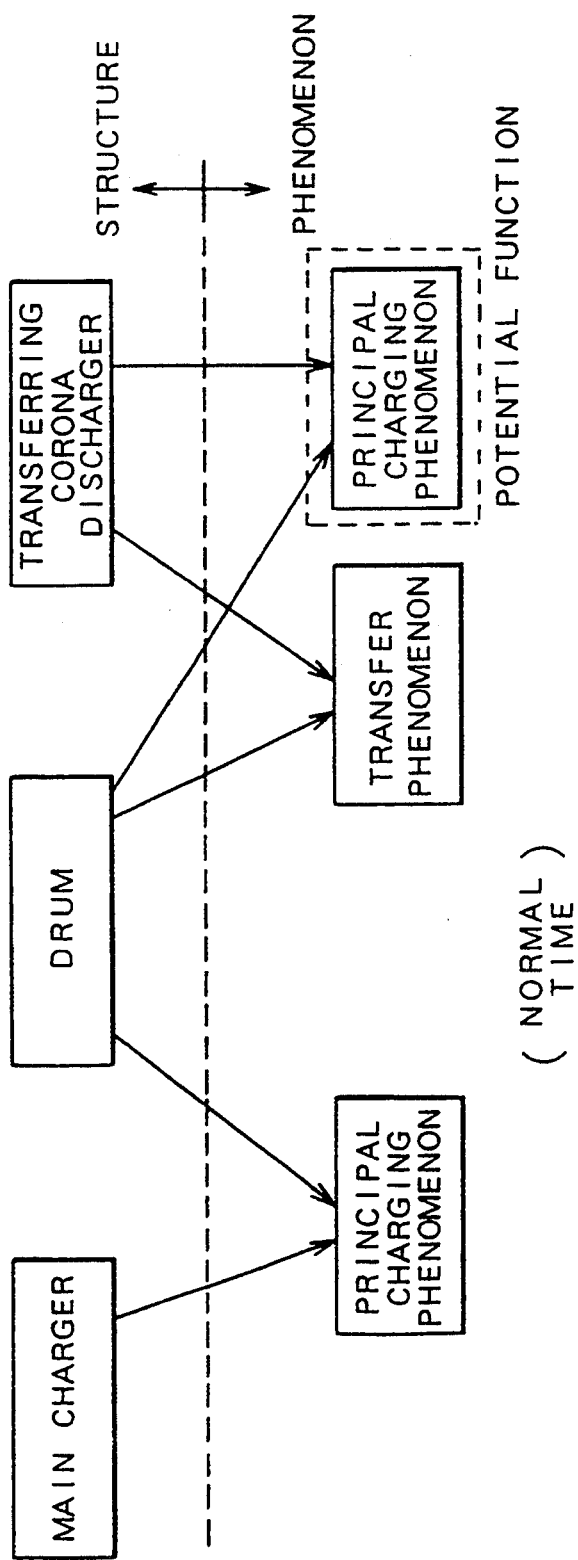
FIG. 21 is a diagram for explaining structures and phenomena at the normal time of an objective model.
Figure 22:
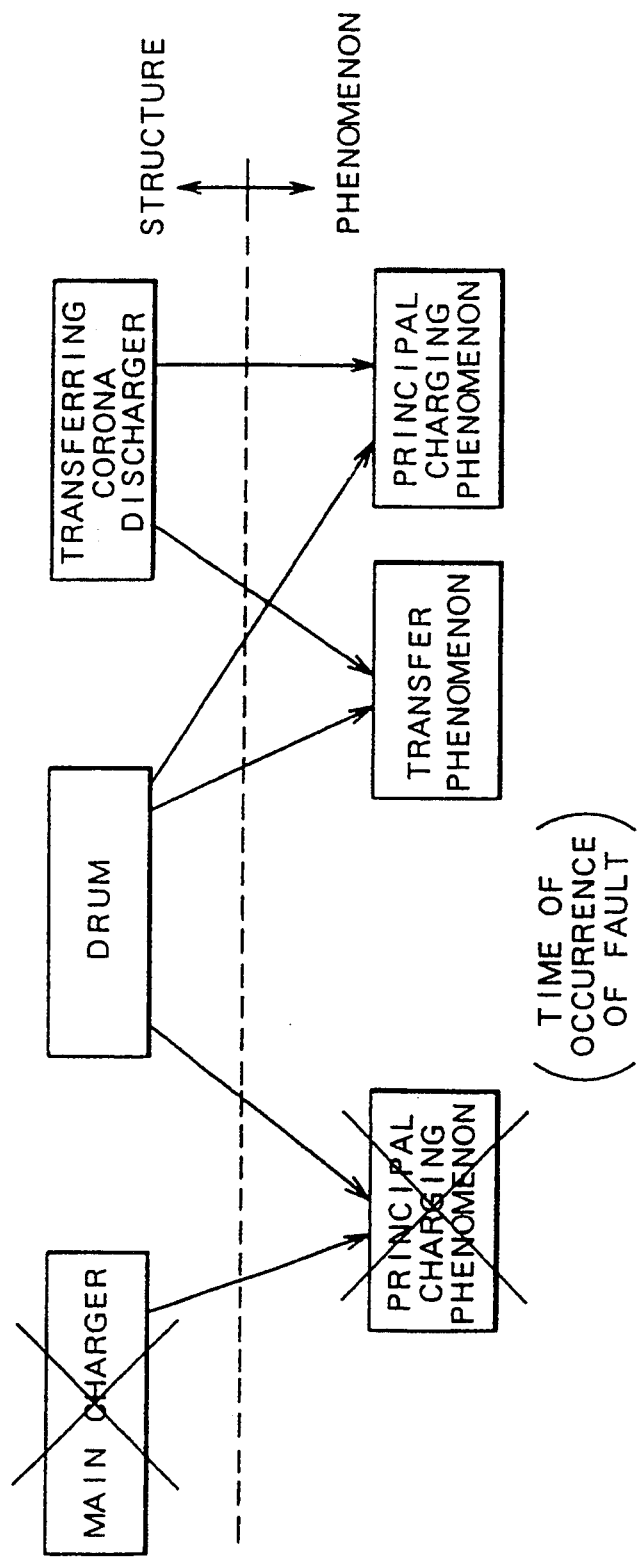
FIG. 22 is a diagram showing structures and phenomena of an objective model in a state where a principal charging phenomenon is developed by a transferring corona discharger when a fault occurs in a main charger.

Briefly stated, the objective model comprises structures and phenomena as shown in FIG. 21 at the normal time. A principal charging phenomenon is developed by the main charger, while a principal charging phenomenon by the transferring corona discharger sleeps as a potential function. When a fault occurs, the principal charging phenomenon by the main charger cannot be developed, so that the principal charging phenomenon by the transferring corona discharger which sleeps as a potential function is developed, as shown in FIG. 22.

Figure 23:
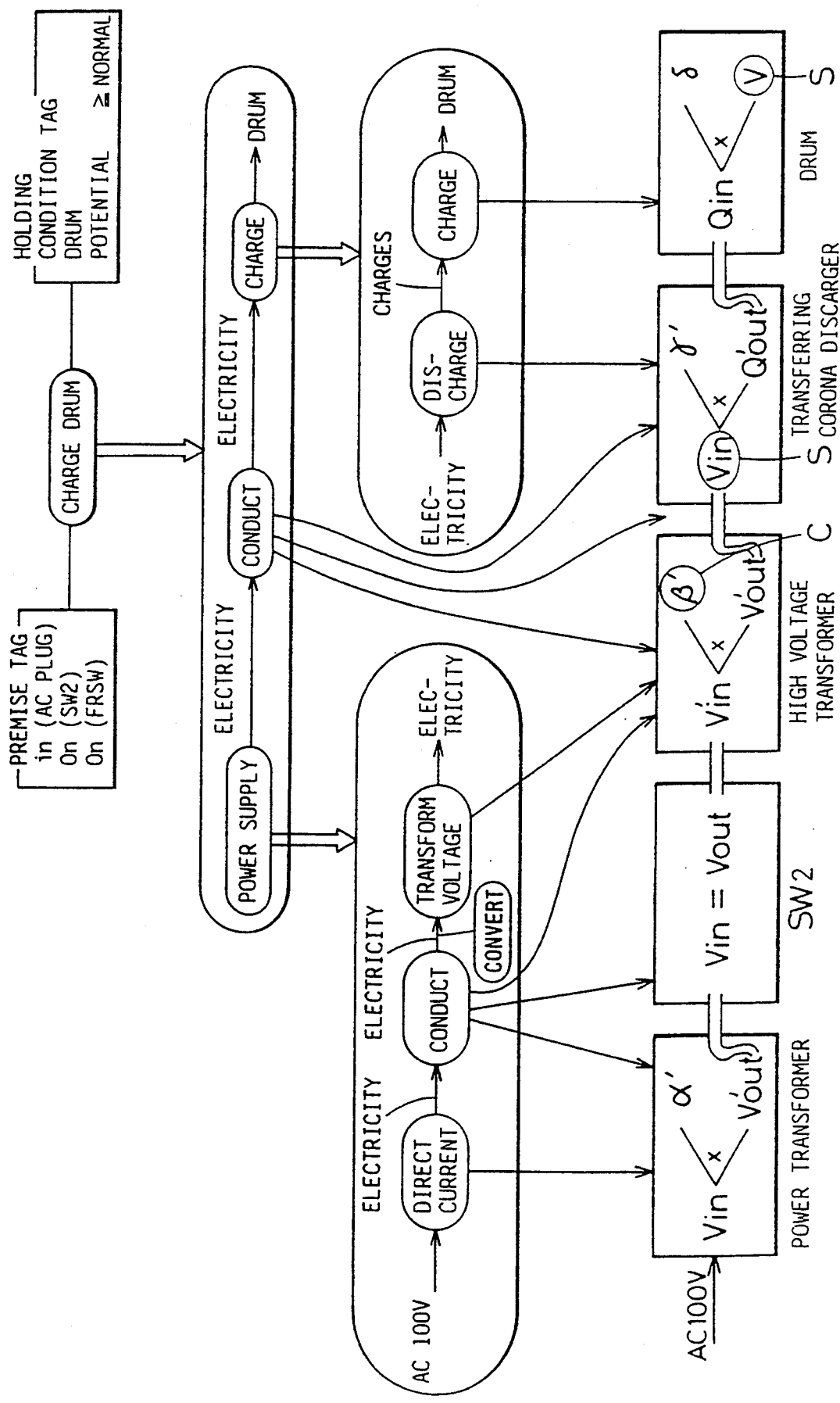
FIG. 23 is a diagram showing an objective model in a case where a transferring corona discharger is used as a functional redundancy system using an FBS diagram.

When the transferring corona discharger 36 is used as a functional redundancy system, the objective model is represented by the FBS diagram as shown in FIG. 23.

A qualitative sequence for image formation processing required in a case where the transferring corona discharger 36 is used as a functional redundancy system is formed (step S15 in FIG. 14). The qualitative sequence is formed in the following order.

(1) As a premise, a structure and a required behavior required to form a qualitative sequence are previously inputted and stored as an objective model of the candidate for functional redundancy selected in the above described manner. The structure comprises parts constituting an objective apparatus, the nature of the relationship among the parts, and physical phenomena described using the above described individual, individual view and process view. That is, the structure is described as a view network. All physical phenomena which may occur with respect to the view network inputted are derived by behavior simulation, and the holding conditions thereof are derived, to manage the state description by an ATMS (Assumption based Truth Maintenance System; advocated by De Kleer). FIG. 24 shows an example of display representing the dependent relationship among all the phenomena which may occur on the view network thus derived.

Furthermore, the required behavior is previously inputted and stored. The required behavior is inputted and stored in two stages. Specifically:

(i) Input of Instantaneous state: Phenomenon, parameter values and the like which are desired to occur as a minimum in a certain state.

(ii) Input of time relationship among states: the representation of the time relationship between instantaneous states. For example, in this concrete example, enumeration of phenomena which are desired to occur "Principal charge→transfer", and the change in parameter "Paper image nothing→Paper image full".

(2) A qualitative sequence is then formed on the basis of the foregoing structure and required behavior which are inputted and stored.

Prior to describing the formation of the qualitative sequence, a qualitative timing chart at the normal time in the image forming mechanism shown in FIG. 13 will be described with reference to FIG. 25. Phenomena at the time of image formation are developed in the order of initial, principal charge, exposure, development and transfer phenomena. The initial phenomenon appears at the time 0. In this case, the charging quantity of a drum is "nothing" and the toner density on the drum is "nothing". At the time 1, the principal charge phenomenon is developed. In this case, a principal charge mode is ON (MC mode=ON), the drum angle is A0, and the charging quantity of the drum is changed from "nothing" to "Full". At the time 2, the exposure phenomenon is then developed. In this case, a halogen lamp is turned on (H1 mode=ON), the drum angle is A1, and the charging quantity of the drum is changed from "Full" to "Exposed". At the time 3, the development phenomenon is developed. In this case, a development mode is ON (Dev mode=ON), the drum angle is A2, the toner density of the drum is changed from "nothing" to "Full". In addition, at the time 4, the transfer phenomenon is developed. In this case, a transfer charge mode is ON (TC mode=ON), the drum angle is A3, the toner density of the drum is "Full".

In such a qualitative timing chart for normal image formation, the required behavior is "principal charge→transfer". That is, the transfer phenomenon must be developed after the principal charge phenomenon is developed.

Description is now made of a qualitative timing chart for image formation at the time of occurrence of a fault, that is, the formation of the qualitative sequence.

Figure 26:
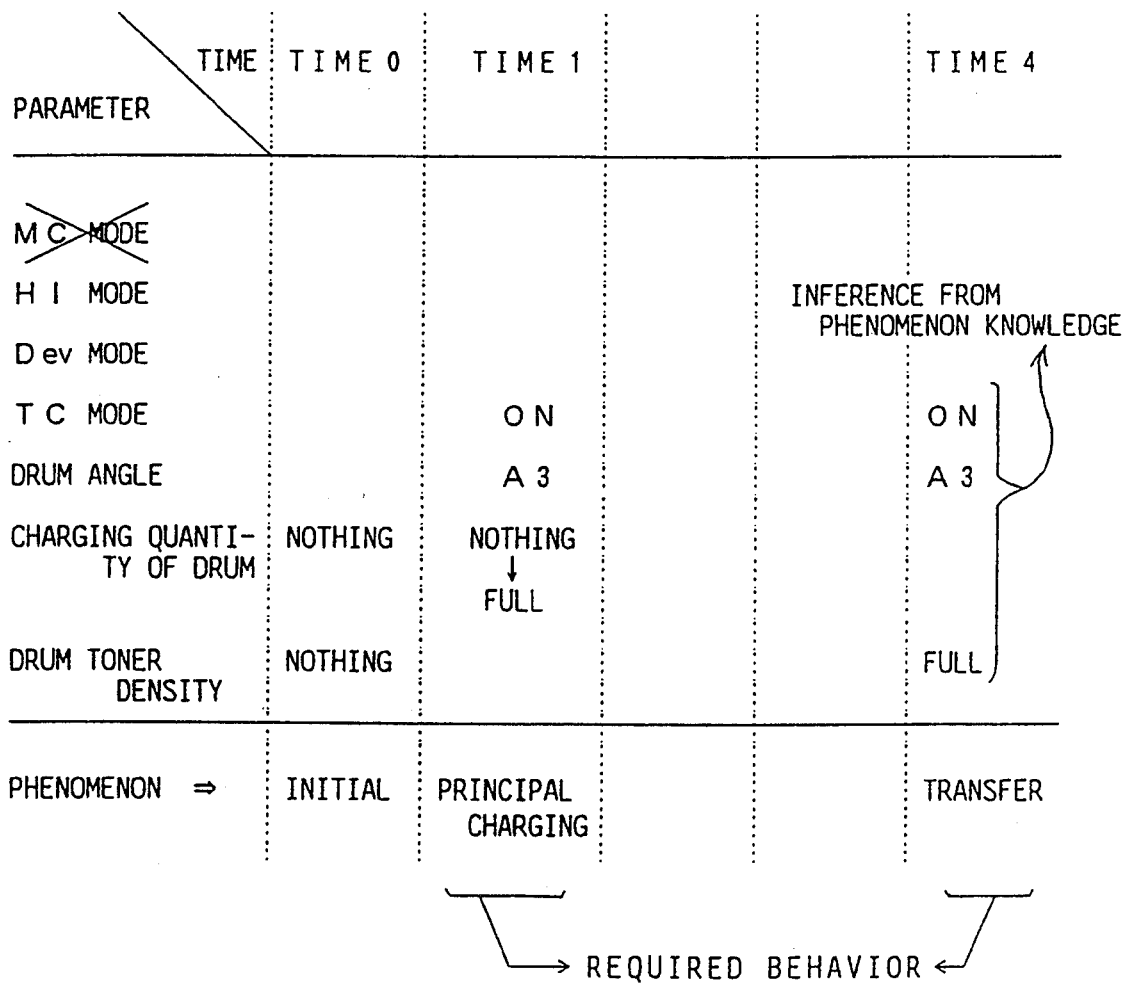
FIG. 26 is a diagram for explaining a method of forming a qualitative sequence at the time of occurrence of a fault.

First, "principal charge→transfer" is derived as the required behavior, and parameter values and the like for each instant in the required behavior is derived from a dependent relationship network of phenomena shown in FIG. 24, as shown in FIG. 26. For example, in order to charge the drum by the transferring corona discharger 36, the following knowledges are derived by retrieving the premise conditions of all the phenomena which may occur shown in FIG. 24:

Conditions: transfer charge mode=ON drum angle=A3

Effect: drum change=nothing→Full

Similarly, in order to transfer an image by the transferring corona discharger 36, the following knowledges are required:

Conditions: transfer charge mode=ON drum angle=A3 drum toner=Full

Accordingly, a timing chart as shown in FIG. 26 is produced.

Figure 27:
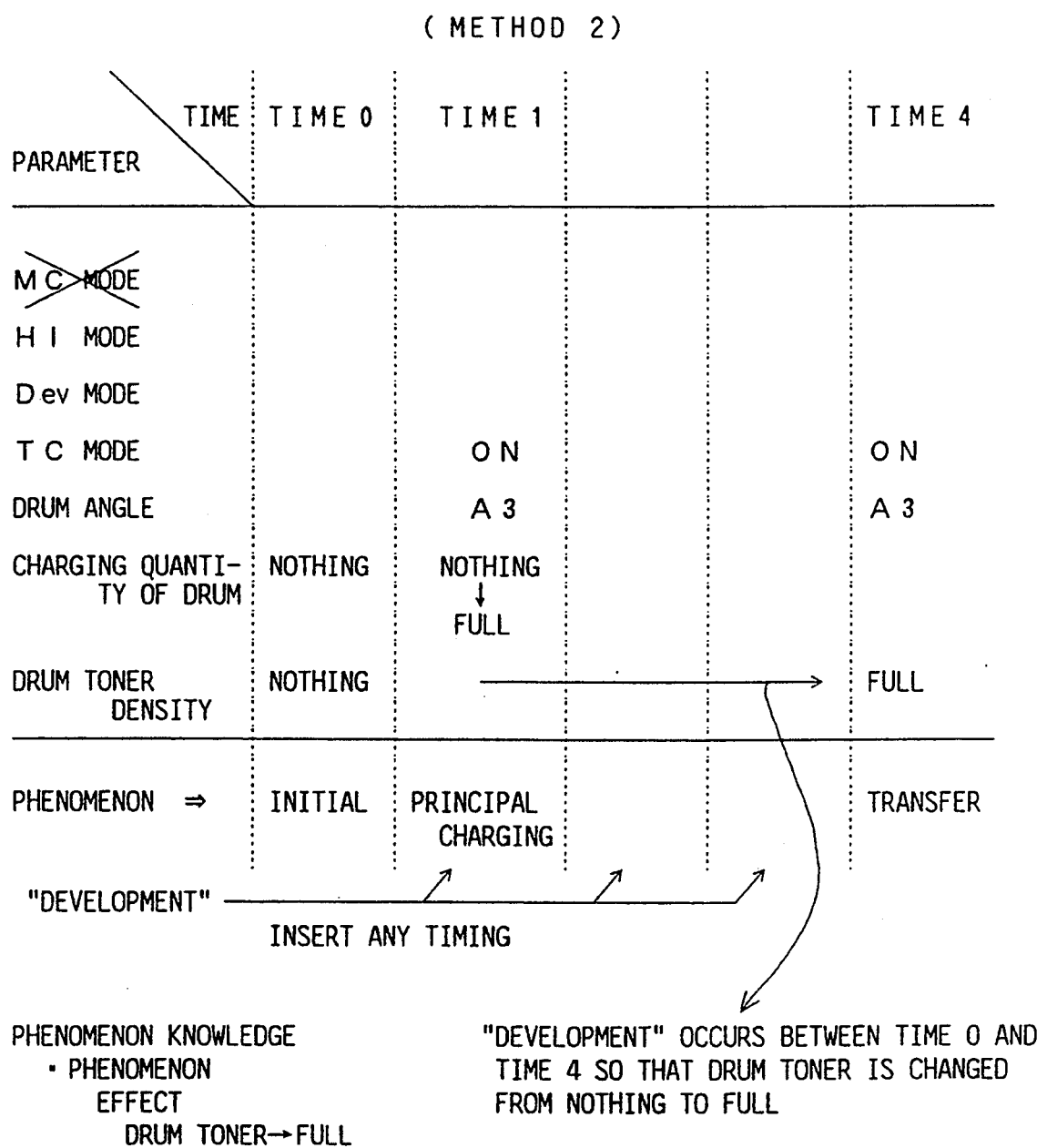
FIG. 27 is a diagram for explaining a method of forming a qualitative sequence at the time of occurrence of a fault.

A phenomenon which must occur between instantaneous states is then derived. As shown in FIG. 27, the drum toner is "nothing" at the time 0, and the drum toner is "Full" at the time 4. Therefore, it can be presumed that "development"must occur as a phenomenon between the time 0 and the time 4.

Therefore, a timing chart shown in FIG. 28 is produced on the basis of the following premise conditions and effect required for the development phenomenon:

Conditions: development mode=ON drum angle=A2 drum charge=Exposed

Effect: drum toner=nothing→Full

In such a manner, the presumption is repeated until the required behavior is satisfied, to fill the discontinuity of all the parameters. As a result, a qualitative timing chart at the time of the occurrence of a fault in the main charger 33 as shown in FIG. 29 is completed.

The timing chart shown in FIG. 29 is a qualitative timing chart. Accordingly, a quantitative value is given to the timing chart to determine the charging time or the like by the transferring corona discharger 36, whereby the control sequence is completed (step S16 in FIG. 14). In this case, the rotation speed of the photosensitive drum 31 is predetermined, and the drum angles A0, A1, A2 and A3 are predetermined, so that the time lengths of the time 0 to the time 4 are naturally determined.

As described in the foregoing, the redundancy system is selected by the functional redundant type repair plan, and the qualitative sequence is further formed and a quantitative value is added thereto, whereby a control program to be executed by the computer 38 is completed.

Before control is actually carried out in accordance with the control program completed, parameter type repair simulation is preferably done (steps S11 and S12), it is determined whether or not the functional redundancy system is operated, the function is recovered, and the secondary adverse effects are exerted, for example, and then, the apparatus is operated. That is, the state where an image is formed in the apparatus after the functional redundancy system is developed is automatically adjusted by the processing in the steps S11 to S13.

2-2-2-5. Parameter type repair simulation

The above described parameter type repair simulation will be described more specifically. In the parameter type repair simulation, the same processing as the parameter type fault judgment previously described (step S11) is performed. As a result, it is presumed that "picture image density low ($O_s$=low)", for example, occurs as a symptom by a symbolic state of the apparatus after the development of the functional redundancy system. Consequently, a parameter operation must be so performed as to repair this symptom "picture image density low". That is, the target of the repair is to increase $O_s$.

Therefore, such inference can be drawn from the relationship on the mathematical model shown in FIG. 15 that $O_s$ can be increased, which is the target of the repair, by increasing $D_s$, by increasing $V_t$, or by increasing $\zeta$.

When the inference is then drawn with increasing $D_s$ as the target, any one of such conclusions is obtained that $V_s$ is increased, $V_b$ is decreased, and $\gamma_0$ is increased. It is thus possible to obtain on the mathematical model candidates for a repair operation by repeating the inference on the basis of the mathematical model. The obtained results are shown in Table 7.

TABLE 7

| $H_L$ = decrease | $V_b$ = decrease |
|---|---|
| D = increase | $\gamma_O$ = increase |
| X = decrease | $D_s$ = increase |
| $\beta$ = decrease | $V_t$ = increase |
| $V_n$ = increase | $\zeta$ = increase |
| $V_s$ = increase | |

Meanwhile, some repair candidates obtained on the basis of the mathematical model may be realized, whereas others may not be realized. For example:

D: Optical density of original cannot be altered, and $\beta$: Sensitivity of photosensitive member is also difficult to alter.

$\gamma_0$: Sensitivity of toner is neither alterable, and $\zeta$: Sensitivity of paper is nor alterable.

Furthermore, in this concrete example, $V_b$: Bias voltage is not also alterable because there is no actuator. It goes without saying that $V_b$ is made alterable by adding an actuator.

Additionally, the following are not made alterable but are only indirectly altered by altering another parameter and thus, are excluded from the repair candidates:

X: Logarithm of amount of original reflected light $V_s$: Surface potential of drum after exposure $D_s$: Toner density on drum Meanwhile, the following, which is not directly related in this concrete example, can be altered by adding an actuator:

$A_{sp}$: Amplitude of separating AC voltage

In the above described manner, the following are taken up as the repair candidates in this concrete example:

$V_t$: Transfer voltage $V_n$: Surface potential after principal charge $H_L$: Logarithm of amount of halogen lamp output light On the other hand, the following knowledges are previously stored as the repair plan knowledge in the memory 38M in the computer 38. Specifically:

(a) $V_t$ is increased.→The control voltage of the transfer high voltage unit 42 is increased.

(b) $V_t$ is decreased.→The control voltage of the transfer high voltage unit 42 is decreased.

(c) $V_n$ is increased.→The control voltage of the main high voltage unit 37 is increased.

(d) $V_n$ is decreased.→The control voltage of the main high voltage unit 37 is decreased.

(e) $H_L$ is increased.→The halogen lamp control signal is shifted to the high voltage side.

(f) $H_L$ is decreased.→The halogen lamp control signal is shifted to the low voltage side.

The repair plan knowledge is characteristic data intrinsic to this apparatus. By applying the repair plan knowledge to the repair candidates obtained on the basis of the mathematical model and adding to the repair plan knowledge the condition in a case where the functional redundancy system is developed, the following three methods are obtained as the repair operation for increasing $O_s$:

(a) $V_t$ is increased.→The control voltage of the transfer high voltage unit 42 is increased at the time 4 (see FIG. 29).

(c) $V_n$ is increased.→The control voltage of the main high voltage unit 37 is increased→The control voltage of the transfer high voltage unit 42 is increased at the time 1 (see FIG. 29).

(f) $H_L$ is decreased.→The halogen lamp control signal is shifted to the low voltage side.

If the picture image density $O_s$ is only increased, repair is possible by carrying out any one of the three methods.

It is considered, however, that the objective apparatus is subjected to a variety of secondary effects by increasing the picture image density $O_s$. In the present embodiment, therefore, inference of the secondary effects is drawn on the basis of the mathematical model as described below.

2-2-2-6. Inference of secondary effects

Figure 30:
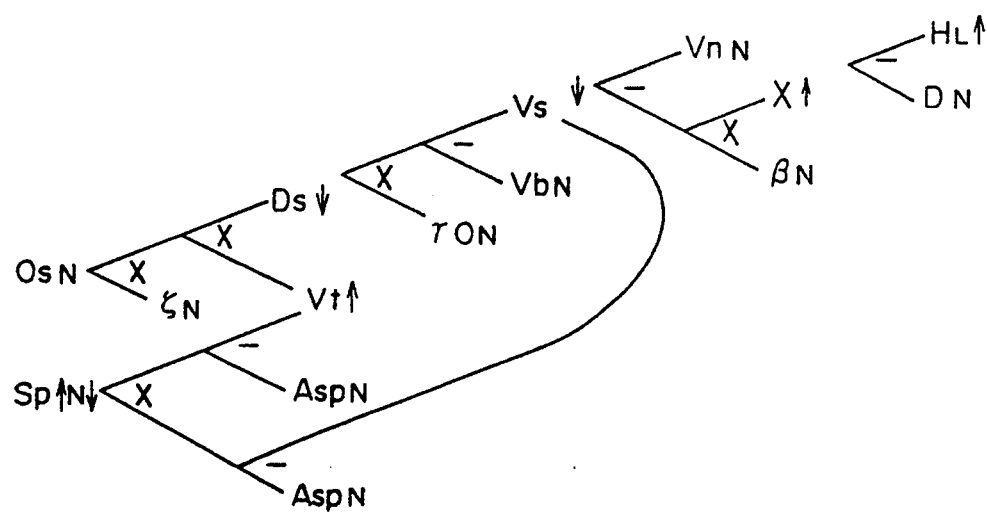
FIG. 30 is a diagram showing development for inference of secondary effects on the mathematical model.
Figure 31:
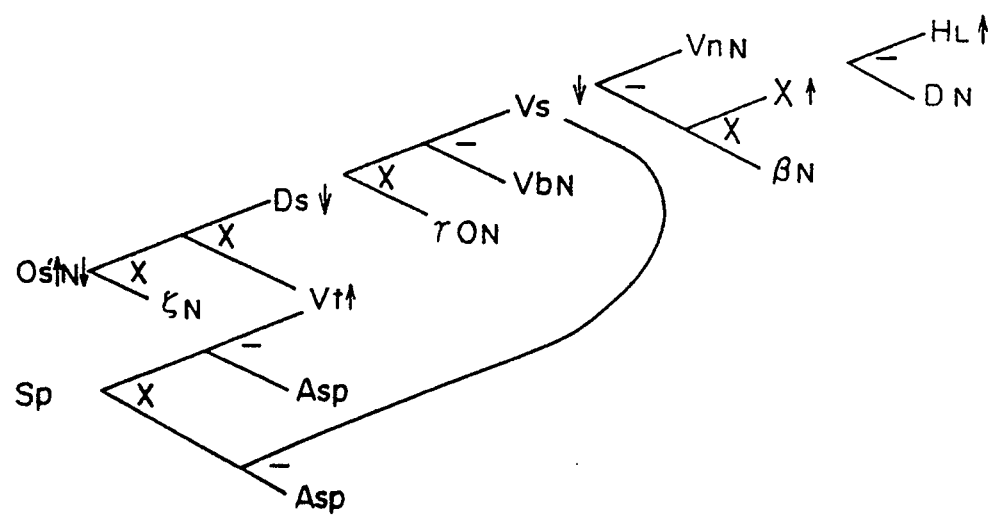
FIG. 31 is a diagram showing development for inference of secondary effects on the mathematical model.
Figure 32:
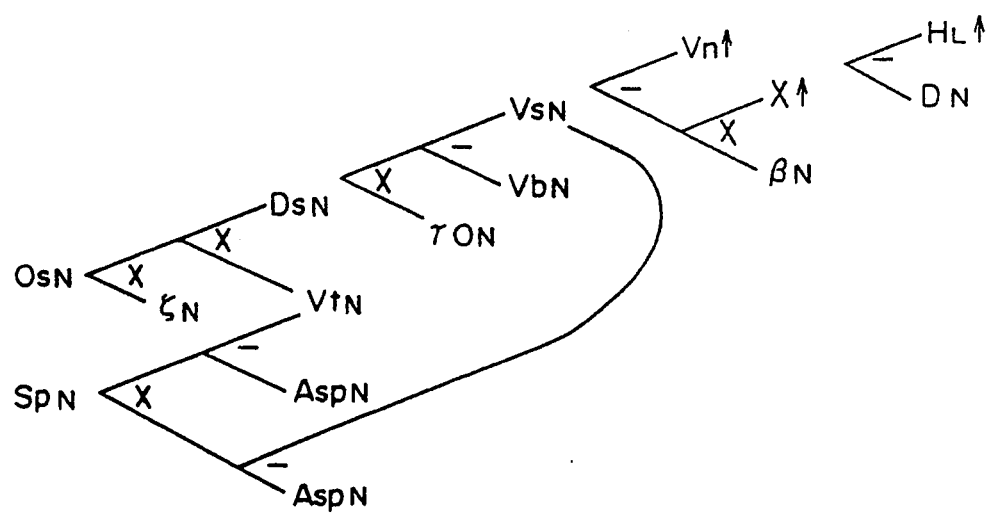
FIG. 32 is a diagram showing development for inference of secondary effects on the mathematical model.
Figure 33:
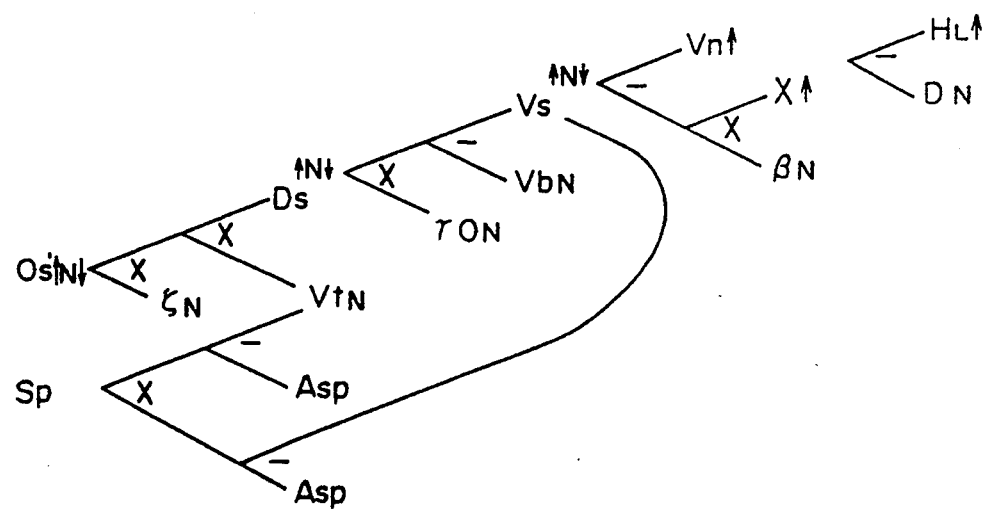
FIG. 33 is a diagram showing development for inference of secondary effects on the mathematical model.
Figure 34:
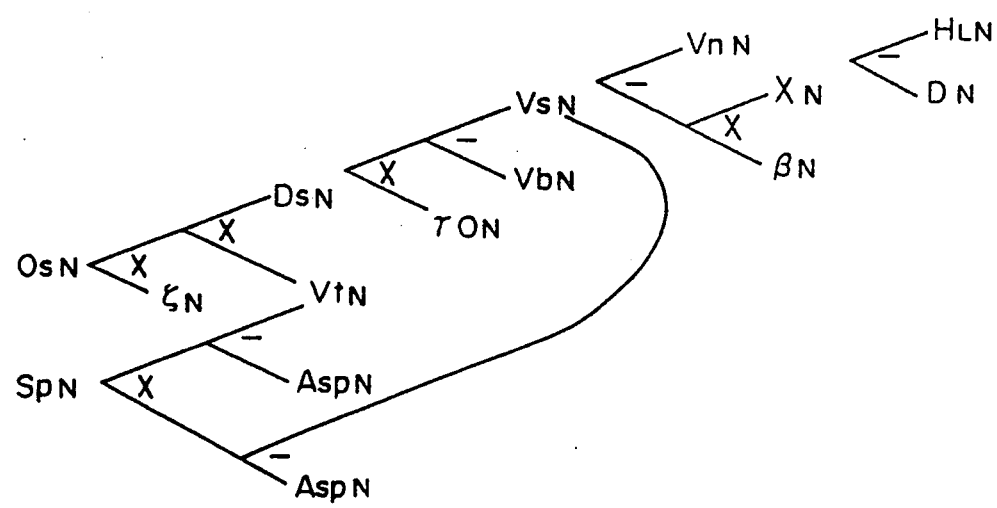
FIG. 34 is a diagram showing development for inference of secondary effects on the mathematical model.
Figure 35:
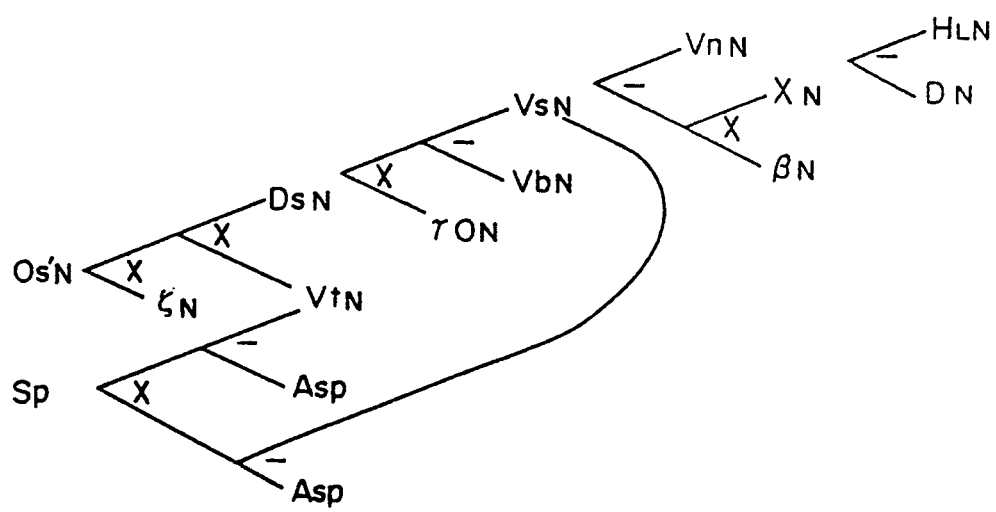
FIG. 35 is a diagram showing development for inference of secondary effects on the mathematical model.

FIGS. 30 to 35 are obtained when three repair plans derived in the inference of the repair plan are developed on a mathematical model. That is, the case (a) where $V_t$ is increased is shown in FIGS. 30 and 31 ($O_s'$ when $D=0$ is shown on the mathematical model in FIG. 31), the case (c) where $V_n$ is increased is shown in FIGS. 32 and 33 ($O_s'$ when $D=0$ is shown on the mathematical model in FIG. 33), and the case (f) where $H_L$ is decreased is shown in FIGS. 34 and 35 ($O_s'$ when $D=0$ is shown on the mathematical model in FIG. 35).

When functional evaluations are carried out on the basis of the mathematical model, inference of the following states is drawn. Specifically:

(1) When $V_t$ is increased (FIGS. 30 and 31)
(a) The output picture image density is increased.
(b) $O_s'$>normal may, in some cases, be created when $D=0$. That is, there is a possibility that fog is generated.
(c) Sp>normal is created, so that there is a possibility that defective separation is performed.

(2) When $V_n$ is increased (FIGS. 32 and 33)
(a) The output picture image density is increased.
(b) $O_s'$>normal is created when $D=0$, so that there is a possibility that fog is generated.

(3) When $H_L$ is decreased (FIGS. 34 and 35)
(a) The output picture image density is only increased, and there are no other secondary effects.

Therefore, in the repair plan portion 15, the repair plan which is subjected to the least secondary effects, that is, to decrease $H_L$ is selected.

2-2-3. Modified examples and others

When the above described image forming mechanism in the electrophotographic copying machine is used as an objective apparatus, the construction is relatively simple. In addition, when a fault occurs in a certain part, it is relatively easy to forecast a part having a potential function which can be substituted for the part which fails. Instead of drawing functional redundancy inference every time a fault occurs in the image forming mechanism, therefore, the ROM, shown in FIG. 11, previously storing the results of functional redundancy inference is formed so that the functional redundant type repair plan can be carried out by the construction shown in FIG. 12. That is, the image forming mechanism can be of construction comprising a so-called simplified type functional redundancy system. Consequently, a functional redundancy system can be developed by reading out the functional redundant type repair plan and the control sequence from the memory, thereby to make it possible to carry out fault repair by the development of the functional redundancy system in a significantly short time.

When with respect to a plurality of function developing means, the presence or absence and the contents of a function which is different from a function inherently required and is not ordinarily developed but is potentially developed by each of the function developing means are thus retrieved, a method of performing sequential retrieval utilizing the FBS diagram every time a fault or the like occurs may be used. Alternatively, a method of previously performing such retrieval and storing the results of the retrieval in the memory to read out corresponding data from the memory at the time of occurrence of a fault or the like can be adopted when the apparatus system is relatively small.

With either method, a so-called "softly broken apparatus" can be realized by functional redundant type repair.

Generally speaking, the simplified type functional redundancy system can be effectively made use of when cases of fault causes and fault symptoms are accumulated even in a relatively simple apparatus or a slightly complicated apparatus system.

On the other hand, a method of carrying out the functional redundant type repair plan utilizing the FBS diagram every time a fault occurs is effective in cases where an apparatus system becomes huge, for example, in a very large-scale apparatus system such as an integrated plant constructed in a wide area or a satellite station floating in a space. The most suitable functional redundant type repair plan can be derived every time a fault occurs.

Although in the above described functional redundancy system using the copying machine as an objective apparatus, the image forming mechanism is taken as an example, the present invention is not limited to the same. For example, it is possible to also realize such a functional redundancy system that when a neutralization lamp for removing charges charged on a photosensitive drum is put off, light of a halogen lamp is introduced into the photosensitive drum to remove the charges charged on the photosensitive drum. Alternatively, it is possible to also realize such a functional redundancy system that when a fault occurs in a cleaner of a photosensitive drum, the photosensitive drum is cleaned utilizing a magnetic blush provided for a developing device.

Furthermore, in a case where there are provided a plurality of paper feeding paths, a redundant function can be also so developed that if a fault occurs in a certain paper feeding path, copy paper is supplied using another paper feeding path.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus having a functional redundancy system, comprising:

functional means comprising a plurality of functional portions, each of the plurality of functional portions having a predetermined inherent function, at least a part of the plurality of functional portions each having a potential function which is different from its predetermined inherent function and which is not ordinarily used;

ordinary control means for operating the plurality of functional portions in accordance with a first sequence such that said plurality of functional portions use their inherent functions; and redundancy system control means for operating functional portions, other than a particular functional portion of said plurality of functional portions, in accordance with a second sequence which is different from said first sequence such that the inherent function of the particular functional portion is replaced by the potential function of another functional portion.

2. The image forming apparatus having a functional redundancy system according to claim 1, wherein said particular functional portion can individually designate a predetermined plurality of functional portions, and the redundancy system control means performs a control operation in accordance with a predetermined sequence out of a predetermined plurality of sequences depending on which of the functional portions is designated.

3. The image forming apparatus having a functional redundancy system according to claim 2, which comprises a ROM storing said predetermined plurality of sequences.

4. The image forming apparatus having a functional redundancy system according to claim 1, wherein said functional means comprises:

a photosensitive member for forming an electrostatic latent image by an electrophotographic system;

principal charging means for performing principal charging so as to charge the surface of said photosensitive member at a predetermined potential; and transfer means capable of transferring as an inherent function and principal charging as a potential function so as to transfer an image formed on the surface of said photosensitive member to a predetermined medium.

5. The image forming apparatus having a functional redundancy system according to claim 4, wherein said photosensitive member comprises a rotating photosensitive member whose image forming surface is moved in an endless shape, said principal charging means and said transfer means are arranged in a predetermined order around said rotating photosensitive member, and said redundancy system control means operates said transfer means in accordance with a predetermined sequence to cause the transfer means to perform principal charging and transfer when a fault occurs in said principal charging means.

6. The image forming apparatus having a functional redundancy system according to claim 1, wherein said functional means comprises:

a photosensitive member for forming an electrostatic latent image by an electrophotographic system;

remaining charge removing means for removing charges remaining on said photosensitive member prior to charging said photosensitive member at a predetermined potential; and exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

7. The image forming apparatus having a functional redundancy system according to claim 6, wherein said photosensitive member comprising a rotating photosensitive member whose image forming surface is moved in an endless shape, said remaining charge removing means and said exposing means are arranged in a predetermined order around said rotating photosensitive member, and said redundancy system control means operates said exposing means in accordance with a predetermined sequence to cause the exposing means to perform neutralization and exposure when a fault occurs in said remaining charge removing means.

8. An image forming apparatus having a functional redundancy system, comprising:

functional means comprising a plurality of functional portions, each of the plurality of functional portions having a predetermined inherent function, at least a part of the plurality of functional portions each having a potential function which is different from its predetermined inherent function and which is not ordinarily used;

diagnosing means for making a diagnosis to judge whether or not a fault occurs in said functional means;

ordinary control means for operating said plurality of functional portions in accordance with a first sequence such that said plurality of functional portions use their inherent functions when it is judged by said diagnosing means that no fault occurs; and redundancy system control means for operating, when it is judged by said diagnosing means that a fault occurs, functional portions, other than a functional portion which fails, in accordance with a second sequence which is different from said first sequence such that the inherent function of the functional portion which fails is replaced by the potential function of another functional portion.

9. The image forming apparatus having a functional redundancy system according to claim 8, wherein said redundancy system control means performs a control operation in accordance with a predetermined sequence out of a predetermined plurality of sequences to correspond to the type of the functional portion which fails.

10. The image forming apparatus having a functional redundancy system according to claim 9, which comprises a ROM storing said predetermined plurality of sequences.

11. The image forming apparatus having a functional redundancy system according to claim 10, wherein said functional means comprises:

a photosensitive member for forming an electrostatic latent image by an electrophotographic system;

principal charging means for performing principal charging so as to charge the surface of said photosensitive member at a predetermined potential; and transfer means capable of performing transfer as an inherent function and principal charging as a potential function so as to transfer an image formed on the surface of said photosensitive member to a predetermined medium.

12. The image forming apparatus having a functional redundancy system according to claim 11, wherein
said photosensitive member comprises a rotating photosensitive member whose image forming surface is moved in an endless shape,
said principal charging means and said transfer means are arranged in a predetermined order around said rotating photosensitive member, and
said redundancy system control means operates said transfer means in accordance with a predetermined sequence to cause the transfer means to perform principal charging and transfer when a fault occurs in said principal charging means.

13. The image forming apparatus having a functional redundancy system according to claim 10, wherein said functional means comprises:
a photosensitive member for forming an electrostatic latent image by an electrophotographic system;
remaining charge removing means for removing charges remaining on said photosensitive member prior to charging said photosensitive member at a predetermined potential; and
exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

14. The image forming apparatus having a functional redundancy system according to claim 13, wherein
said photosensitive member comprises a rotating photosensitive member whose image forming surface is moved in an endless shape,
said remaining charge removing means and said exposing means are arranged in a predetermined order around said rotating photosensitive member, and
said redundancy system control means operates said exposing means in accordance with a predetermined sequence to cause the exposing means to perform neutralization and exposure when a fault occurs in said remaining charge removing means.

15. The image forming apparatus having a functional redundancy system according to claim 8, wherein
said diagnosing means diagnoses, when a functional portion is operated by said redundancy system control means, an operating state of the functional portion operated by the redundancy system control means.

16. The image forming apparatus having a functional redundancy system according to claim 15, wherein said diagnosing means comprises:
storing means for storing qualitative data representing said functional means as a combination of a plurality of elements and qualitatively representing attributes of the respective elements and the combinational relationship among the elements using parameters;
operating means for simulating, when a functional portion is operated by said redundancy system control means, operation of the functional portion operated by the redundancy system control means on the basis of qualitative data stored in said storing means when it is judged that an operating state of the functional portion operated is not normal, and operating an adjusting work plan carried out by a parameter operation on the basis of the results of the simulation; and
parameter type state adjusting means for executing the results of the operation performed by the operating means.

17. The image forming apparatus having a functional redundancy system according to claim 16, wherein said functional means comprises:
a photosensitive member for forming an electrostatic latent image by an electrophotographic system;
principal charging means for performing principal charging so as to charge the surface of said photosensitive member at a predetermined potential; and
transfer means capable of performing transfer as an inherent function and principal charging as a potential function so as to transfer an image formed on the surface of said photosensitive member to a predetermined medium.

18. The image forming apparatus having a functional redundancy system according to claim 17, wherein
said photosensitive member comprises a rotating photosensitive member whose image forming surface is moved in an endless shape,
said principal charging means and said transfer means are arranged in a predetermined order around said rotating photosensitive member, and
said redundancy system control means operates said transfer means in accordance with a predetermined sequence to cause the transfer means to perform principal charging and transfer when a fault occurs in said principal charging means.

19. The image forming apparatus having a functional redundancy system according to claim 16, wherein said functional means comprises:
a photosensitive member for forming an electrostatic latent image by an electrophotographic system;
remaining charge removing means for removing charges remaining on said photosensitive member prior to charging said photosensitive member at a predetermined potential; and
exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

20. The image forming apparatus having a functional redundancy system according to claim 19, wherein
said photosensitive member comprises a rotating photosensitive member whose image forming surface is moved in an endless shape,
said remaining charge removing means and said exposing means are arranged in a predetermined order around said rotating photosensitive member, and
said redundancy system control means operates said exposing means in accordance with a predetermined sequence to cause the exposing means to perform neutralization and exposure when a fault occurs in said remaining charge removing means.

21. The image forming apparatus having a functional redundancy system according to claim 8, wherein said diagnosing means comprises:
   storing means for storing qualitative data representing said functional means as a combination of a plurality of elements and qualitatively representing attributes of the respective elements and the combinational relationship among the elements using parameters;
   operating means for operating, when it is judged that a fault occurs in said functional means, fault repair work performed by a parameter operation on the basis of qualitative data stored in the storing means;
   parameter type fault repairing means for executing the results of the operation performed by the operating means; and
   means for outputting, when the fault in the functional means cannot be repaired by the parameter type fault repairing means, the occurrence of the fault.

22. The image forming apparatus having a functional redundancy system according to claim 21, wherein said diagnosing means further comprises:
   operating means for diagnosing, when a functional portion is operated by said redundancy system control means, an operating state of the functional portion operated by the redundancy system control means, simulating an operation of the functional portion operated on the basis of the qualitative data stored in said storing means when it is judged that the operating state is not normal, and operating an adjusting work plan carried out by a parameter operation on the basis of the results of the simulation; and
   parameter type state adjusting means for executing the results of the operation performed by the operating means.

23. The image forming apparatus having a functional redundancy system according to claim 22, wherein said functional means comprises:
   a photosensitive member for forming an electrostatic latent image by an electrophotographic system;
   principal charging means for performing principal charging so as to charge the surface of said photosensitive member at a predetermined potential; and
   transfer means capable of performing transfer as an inherent function and principal charging as a potential function so as to transfer an image formed on the surface of said photosensitive member to a predetermined medium.

24. The image forming apparatus having a functional redundancy system according to claim 23, wherein
   said photosensitive member comprises a rotating photosensitive member whose image forming surface is moved in an endless shape,
   said principal charging means and said transfer means are arranged in a predetermined order around said rotating photosensitive member, and
   said redundancy system control means operates said transfer means in accordance with a predetermined sequence to cause the transfer means to perform principal charging and transfer when a fault occurs in said principal charging means.

25. The image forming apparatus having a functional redundancy system according to claim 22, wherein said functional means comprises:
   a photosensitive member for forming an electrostatic latent image by an electrophotographic system;
   remaining charge removing means for removing charges remaining on said photosensitive member prior to charging said photosensitive member at a predetermined potential; and
   exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

26. The image forming apparatus having a functional redundancy system according to claim 25, wherein
   said photosensitive member comprises a rotating photosensitive member whose image forming surface is moved in an endless shape,
   said remaining charge removing means and said exposing means are arranged in a predetermined order around said rotating photosensitive member, and
   said redundancy system control means operates said exposing means in accordance with a predetermined sequence to cause the exposing means to perform neutralization and exposure when a fault occurs in said remaining charge removing means.

27. The image forming apparatus having a functional redundancy system according to claim 21, wherein said functional means comprises:
   a photosensitive member for forming an electrostatic latent image by an electrophotographic system;
   principal charging means for performing principal charging so as to charge the surface of said photosensitive member at a predetermined potential; and
   transfer means capable of performing transfer as an inherent function and principal charging as a potential function so as to transfer an image formed on the surface of said photosensitive member to a predetermined medium.

28. The image forming apparatus having a functional redundancy system according to claim 27, wherein
   said photosensitive member comprises a rotating photosensitive member whose image forming surface is moved in an endless shape,
   said principal charging means and said transfer means are arranged in a predetermined order around said rotating photosensitive member, and
   said redundancy system control means operates said transfer means in accordance with a predetermined sequence to cause the transfer means to principal charging and transfer when a fault occurs in said principal charging means.

29. The image forming apparatus having a functional redundancy system according to claim 21, wherein said functional means comprises:
   a photosensitive member for forming an electrostatic latent image by an electrophotographic system;
   remaining charge removing means for removing charges remaining on said photosensitive member prior to charging said photosensitive member at a predetermined potential; and
   exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

30. The image forming apparatus having a functional redundancy system according to claim 29, wherein
said photosensitive member comprises a rotating photosensitive member whose image forming surface is moved in an endless shape,
said remaining charge removing means and said exposing means are arranged in a predetermined order around said rotating photosensitive member, and
said redundancy system control means operates said exposing means in accordance with a predetermined sequence to cause the exposing means to perform neutralization and exposure when a fault occurs in said remaining charge removing means.

31. An image forming apparatus having functional redundancy system, comprising:
storing means for storing information concerning the contents of at least a part of the image forming apparatus in predetermined relational representation using functions, behavior and states which define a FBS diagram;
means for retrieving a substitutable function which can be substituted for a particular function in the apparatus on the basis of the FBS diagram stored in the storing means; and
redundancy system control means for operating the apparatus using a substitutable function retrieved by the means for retrieving.

32. The image forming apparatus having a functional redundancy system according to claim 31, wherein
said FBS diagram clearly represents a many-to-many correspondence between a plurality of functions and a plurality of behaviors.

33. The image forming apparatus having a functional redundancy system according to claim 32, which further comprises diagnosing means for making a diagnosis to judge whether or not a fault occurs in the apparatus,
said retrieving means being operated when it is judged by said diagnosing means that a fault occurs in the apparatus.

34. The image forming apparatus having a functional redundancy system according to claim 33, wherein said diagnosing means comprises:
storing means representing said functional means as a combination of a plurality of elements and qualitatively representing attributes of the respective elements and the combinational relationship among the elements using parameters;
operating means for diagnosing, when a functional portion is operated by said redundancy system control means, an operating state of the functional portion operated by the redundancy system control means, simulating an operation of the functional portion operated by the redundancy system control means on the basis of the qualitative data stored in said storing means when it is judged that the operating state of the functional portion operated is not normal, and operating an adjusting work plan carried out by a parameter operation on the basis of the results of the simulation; and
parameter type state adjusting means for executing the results of the operation performed by the operating means.

35. The image forming apparatus having a functional redundancy system according to claim 34, wherein said functional means comprises:
a photosensitive member for forming an electrostatic latent image by an electrophotographic system;
principal charging means for performing principal charging so as to charge the surface of said photosensitive member at a predetermined potential; and
transfer means capable of performing transfer as an inherent function and principal charging as a potential function so as to transfer an image formed on the surface of said photosensitive member to a predetermined medium.

36. The image forming apparatus having a functional redundancy system according to claim 35, wherein
said photosensitive member comprises a rotating photosensitive member whose image forming surface is moved in an endless shape,
said principal charging means and said transfer means are arranged in a predetermined order around said rotating photosensitive member, and
said redundancy system control means operates said transfer means in accordance with a predetermined sequence to cause the transfer means to perform principal charging and transfer when a fault occurs in said principal charging means.

37. The image forming apparatus having a functional redundancy system according to claim 34, wherein said functional means comprises:
a photosensitive member for forming an electrostatic latent image by an electrophotographic system;
remaining charge removing means for removing charges remaining on said photosensitive member prior to charging said photosensitive member at a predetermined potential; and
exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

38. The image forming apparatus having a functional redundancy system according to claim 37, wherein
said photosensitive member comprises a rotating photosensitive member whose image forming surface is moved in an endless shape,
said remaining charge removing means and said exposing means are arranged in a predetermined order around said rotating photosensitive member, and
said redundancy system control means operates said exposing means in accordance with a predetermined sequence to cause the exposing means to perform neutralization and exposure when a fault occurs in said remaining charge removing means.

39. The image forming apparatus having a functional redundancy system according to claim 33, wherein said diagnosing means comprises:
storing means representing said functional means as a combination of a plurality of elements and qualitatively representing behaviors or attributes of the respective elements and the combinational relationship among the elements using parameters;
operating means for operating, when it is judged that a fault occurs in said functional means, fault repair work performed by a parameter operation on the basis of the qualitative data stored in the storing means;

parameter type fault repair means for executing the results of the operation performed by the operating means; and means for outputting, when the fault in the functional means cannot be repaired by the parameter type fault repair means, the occurrence of the fault.

40. The image forming apparatus having a functional redundancy system according to claim 39, wherein said diagnosing means further comprises:

operating means for diagnosing, when a functional portion is operated by said redundancy system control means, an operating state of the functional portion operated by the redundancy system control means, simulating an operation of the functional portion operated on the basis of the qualitative data stored in said storing means when it is judged that the operating state is not normal, and operating an adjusting work plan carried out by a parameter operation on the basis of the results of the simulation; and parameter type state adjusting means for executing the results of the operation performed by the operating means.

41. The image forming apparatus having a functional redundancy system according to claim 40, wherein said functional means comprises:

a photosensitive member for forming an electrostatic latent image by an electrophotographic system;

principal charging means for performing principal charging so as to charge the surface of said photosensitive member at a predetermined potential; and transfer means capable of performing transfer as an inherent function and principal charging as a potential function so as to transfer an image formed on the surface of said photosensitive member to a predetermined medium.

42. The image forming apparatus having a functional redundancy system according to claim 41, wherein said photosensitive member comprises a rotating photosensitive member whose image forming surface is moved in an endless shape, said principal charging means and said transfer means are arranged in a predetermined order around said rotating photosensitive member, and said redundancy system control means operates said transfer means in accordance with a predetermined sequence to cause the transfer means to perform principal charging and transfer when a fault occurs in said principal charging means.

43. The image forming apparatus having a functional redundancy system according to claim 40, wherein said functional means comprises:

a photosensitive member for forming an electrostatic latent image by an electrophotographic system;

remaining charge removing means for removing charges remaining on said photosensitive member prior to charging said photosensitive member at a predetermined potential; and exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

44. The image forming apparatus having a functional redundancy system according to claim 43, wherein said photosensitive member comprises a rotating photosensitive member whose image forming surface is moved in an endless shape, said remaining charge removing means and said exposing means are arranged in a predetermined order around said rotating photosensitive member, and said redundancy system control means operates said exposing means in accordance with a predetermined sequence to cause the exposing means to perform neutralization and exposure when a fault occurs in said remaining charge removing means.

45. The image forming apparatus having a functional redundancy system according to claim 39, wherein said functional means comprises:

a photosensitive member for forming an electrostatic latent image by an electrophotographic system;

principal charging mens for performing principal charging so as to charge the surface of said photosensitive member at a predetermined potential; and transfer means capable of performing transfer as an inherent function and principal charging as a potential function so as to transfer an image formed on the surface of said photosensitive member to a predetermined medium.

46. The image forming apparatus having a functional redundancy system according to claim 45, wherein said photosensitive member comprises a rotating photosensitive member whose image forming surface is moved in an endless shape, said principal charging means and said transfer means are arranged in a predetermined order around said rotating photosensitive member, and said redundancy system control means operates said transfer means in accordance with a predetermined sequence to cause the transfer means to perform principal charging and transfer when a fault occurs in said principal charging means.

47. The image forming apparatus having a functional redundancy system according to claim 39, wherein said functional means comprises:

a photosensitive member for forming an electrostatic latent image by an electrophotographic system;

remaining charge removing means for removing charges remaining on said photosensitive member prior to charging said photosensitive member at a predetermined potential; and exposing means for performing forming of an electrostatic latent image on said photosensitive member after said photosensitive member is charged at a predetermined potential by exposing the photosensitive member to light corresponding to the image to be formed as an inherent function, and removing charges on the photosensitive member as a potential function.

48. The image forming apparatus having a functional redundancy system according to claim 47, wherein said photosensitive member comprises a rotating photosensitive member whose image forming surface is moved in an endless shape, said remaining charge removing means and said exposing means are arranged in a predetermined order around said rotating photosensitive member, and said redundancy system control means operates said exposing means in accordance with a predetermined sequence to cause the exposing means to perform neutralization and exposure when a fault occurs in said remaining charge removing means.

* * * * *